US011474988B2

(12) United States Patent
Cugnasco et al.

(10) Patent No.: US 11,474,988 B2
(45) Date of Patent: Oct. 18, 2022

(54) DISTRIBUTED INDEXES

(71) Applicants: BARCELONA SUPERCOMPUTING CENTER—CENTRO NACIONAL DE SUPERCOMPUTACIÓN, Barcelona (ES); UNIVERSITAT POLITÈCNICA DE CATALUNYA, Barcelona (ES)

(72) Inventors: Cesare Cugnasco, Barcelona (ES); Yolanda Becerra Fontal, Barcelona (ES)

(73) Assignees: BARCELONA SUPERCOMPUTING CENTER—CENTRO NACIONAL DE SUPERCOMPUTACIÓN, Barcelona (ES); UNIVERSITAT POLITÉCNICA DE CATALUNYA, Barcelona (ES)

( * ) Notice: Subject to any disclaimer, the term of this patent is extended or adjusted under 35 U.S.C. 154(b) by 0 days.

(21) Appl. No.: 17/281,901

(22) PCT Filed: Nov. 15, 2018

(86) PCT No.: PCT/EP2018/081340
§ 371 (c)(1),
(2) Date: Mar. 31, 2021

(87) PCT Pub. No.: WO2020/069765
PCT Pub. Date: Apr. 9, 2020

(65) Prior Publication Data
US 2021/0397594 A1    Dec. 23, 2021

(30) Foreign Application Priority Data

Oct. 2, 2018 (EP) .................................. 18382698

(51) Int. Cl.
*G06F 16/22* (2019.01)
*G06F 16/27* (2019.01)

(52) U.S. Cl.
CPC ...... *G06F 16/2272* (2019.01); *G06F 16/2246* (2019.01); *G06F 16/2264* (2019.01); *G06F 16/278* (2019.01)

(58) Field of Classification Search
CPC ............ G06F 16/2246; G06F 16/2264; G06F 16/2272; G06F 16/278
See application file for complete search history.

(56) References Cited

U.S. PATENT DOCUMENTS

| 5,806,065 A | 9/1998 | Lomet |
| 2006/0106758 A1* | 5/2006 | Chen ................... G06F 16/284 |

(Continued)

FOREIGN PATENT DOCUMENTS

CN          1866918 A   *  11/2006

OTHER PUBLICATIONS

D. Lomet, "Replicated indexes for distributed data," Fourth International Conference on Parallel and Distributed Information Systems, 1996, pp. 108-119, doi: 10.1109/PDIS.1996.568673. (Year: 1996).*

(Continued)

*Primary Examiner* — James E Richardson
(74) *Attorney, Agent, or Firm* — Peter B. Scull; EIP US LLP

(57) ABSTRACT

Methods are provided of optimizing a tree-structured distributed-index with tree-nodes including data-elements and parent-child relations between tree-nodes. The distributed-index is stored in distributed system including computer-nodes each storing tree-nodes and a tree-map structurally describing the distributed-index. The methods include: inspecting the tree-map in first computer-node to determine whether the distributed-index is imbalanced due to a first tree-node in first computer-node and, in said case: notifying to other computer-nodes that first tree-node is replicable, to provoke that any request from other computer-nodes of inserting a data-element in first-tree-node includes inserting the data-element in corresponding child-node of first-tree-node; and verifying whether the other computer-nodes have been notified and, in said case, replicating data-elements stored in first tree-node into children-nodes thereof. Methods of inserting into and/or querying such distributed indexes or similar are also provided, along with computer (Continued)

programs and (computing) systems that are suitable for performing said optimizing, inserting and querying methods.

19 Claims, 7 Drawing Sheets

(56) References Cited

U.S. PATENT DOCUMENTS

| | | | |
|---|---|---|---|
| 2007/0079004 A1 | 4/2007 | Tatemura et al. | |
| 2007/0094277 A1* | 4/2007 | Fachan | G06F 16/2246 |
| 2013/0151535 A1* | 6/2013 | Dusberger | G06F 16/2272 |
| | | | 707/E17.049 |

OTHER PUBLICATIONS

International Search Report and Written Opinion of the International Searching Authority. International Application No. PCT/EP2018/081340 issued by the European Patent Office, dated Mar. 18, 2019, 14 pages, Rijswijk, Netherlands.

\* cited by examiner

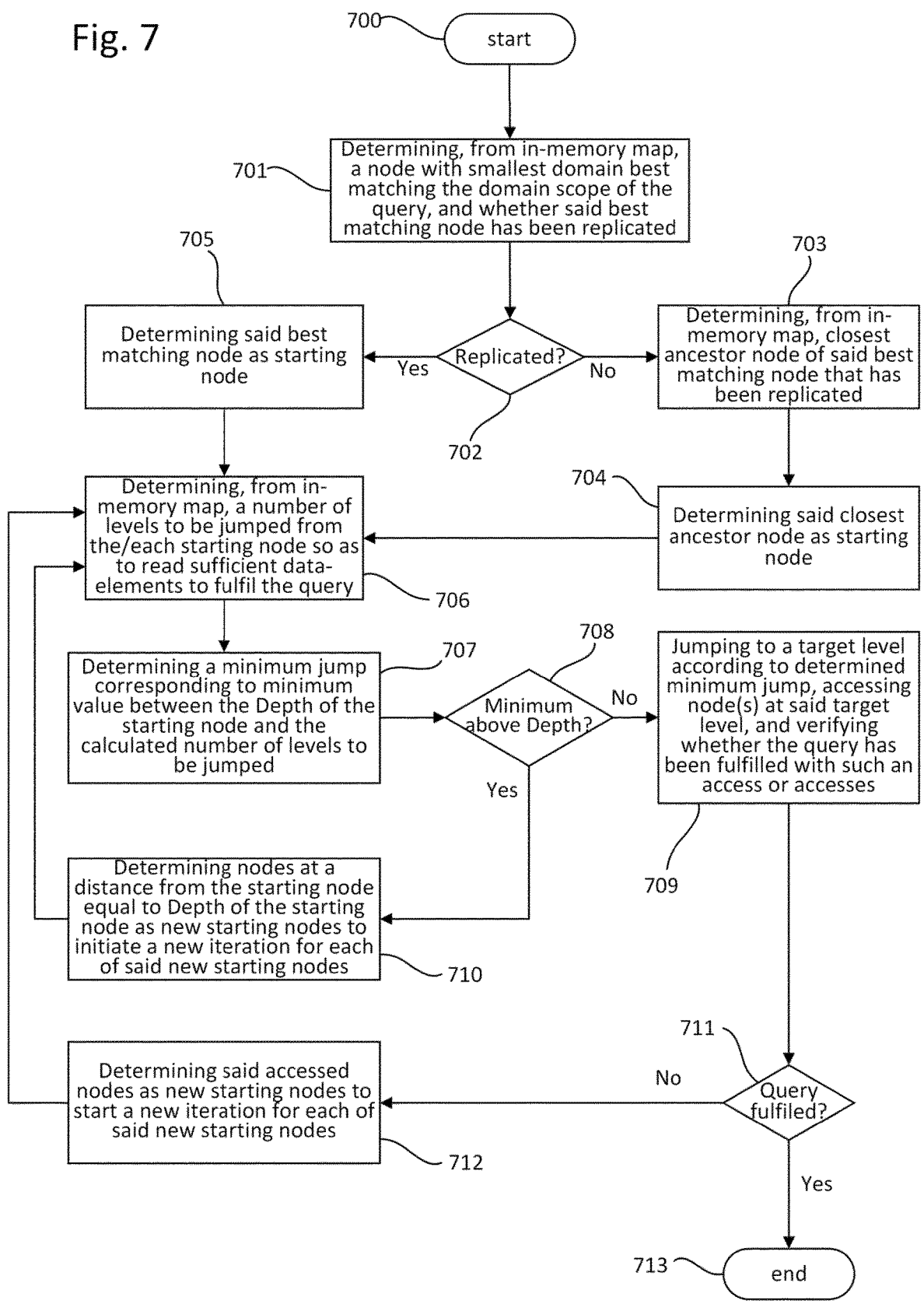

DISTRIBUTED INDEXES

The present disclosure relates to methods of optimizing distributed indexes, and to insertion and querying methods in such distributed indexes or similar. The present disclosure further relates to computer programs, systems and computing systems suitable for performing said optimizing, insertion and querying methods.

BACKGROUND

A wide variety of indexing algorithms and structures are known, which tend to organize data in hierarchical structures that are not very suitable for distributed approaches in distributed environments, i.e. over multiple machines hosting different parts of the index. Expensive operations as distributed transactions and locks may be required to preserve the consistency of data across the different machines forming the distributed index.

Typical indexes and indexing algorithms include, for example, 2-dimensional (or D-dimensional) space-partitioning indexing algorithms (and structures) that divide the domain into partitions of fixed size. These algorithms are based on principles similar to following ones: first, a partition or square is created and, then, data is stored in said partition and, then, when the number of elements stored in the partition reaches a threshold, the partition is split into smaller equally-sized parts. Finally, the stored items (data) are redistributed into the smaller squares. During the splitting phase, a lock has to be created on the first partition, the smaller squares in remote nodes are created at remote computer-nodes, all the data is moved into the smaller squares and, finally, locks are released. While the cost of such operations in a single machine can be negligible, they are prohibitive when storing the index on multiple servers in a distributed manner. Distributed locks may not only be an obstacle for the system availability, but they may also increase response latency and diminish throughput.

Apart from updating the structure, there is also the problem of querying it. A hierarchy means that all interrogations must access to the same root elements: all queries in a database system must pass through the same single server, sharply constraining the overall cluster performance.

An aspect hereof may include providing optimizing, insertion and querying methods performable in distributed indexes, and/or computer programs, systems and computing systems that may perform such methods, and may improve flexibility, reliability and/or efficiency of current methods and systems aimed at same or similar purposes.

SUMMARY

In a first aspect, methods may include optimizing a distributed index having a tree structure including a plurality of tree-nodes including a root node, a plurality of non-root nodes and parent-child relations between the tree-nodes. The root node covers a D-dimensional space, and each of the non-root nodes covers a part of the D-dimensional space such that each of the non-root nodes with same parent node covers a partition of the whole or part of the D-dimensional space or domain covered by said parent node. At least some of the tree-nodes stores one or more data-elements each having space-coordinates within the whole or part of the D-dimensional space (or domain) covered by the tree-node in which the data-element is stored. The distributed index is disposed in a distributed system including a plurality of computer-nodes, and each of at least some of the tree-nodes is stored at one of the computer-nodes along with an in-memory map structurally describing the distributed index. The in-memory maps may be (continuously or regularly or opportunistically) updated according to structural changes occurred in the distributed index.

These optimization methods may include inspecting, by a first computer-node in the plurality of computer-nodes, the in-memory map stored at the first computer-node to determine whether the distributed index satisfies a storage imbalance condition caused by at least a first tree-node stored in the first computer-node and, in said case, triggering a reorganization method. This first tree-node may also be denominated as imbalance-inductor node in the sense that the imbalance condition is caused (or induced) by at least said first tree-node.

The reorganization method may include notifying, by the first computer-node, to other computer-nodes in the plurality of computer-nodes that the first tree-node is to be replicated, so as to enforce or provoke that any request from any of the other computer-nodes of inserting a data-element in the first tree-node further includes (a request of) inserting the data-element in a child node of the first tree-node, depending on the space-coordinates of said data-element and the domain of (or part of the D-dimensional space covered by) said child node.

The reorganization method may further include verifying, by the first computer-node, whether the other computer-nodes have been notified and, in said case, replicating (or triggering replication of) the data-elements stored in the first tree-node into children nodes of the first tree-node, depending on the space-coordinates of each of said data-elements and the domain of (or part of the D-dimensional space covered by) each of said children nodes.

The optimization hereof methods clearly improve reliability, efficiency and/or flexibility of current methods and techniques related to distributed indexes for data access. A detected storage imbalance (e.g. overflowed tree-node) is compensated by replicating the tree-node (or tree-nodes) that induces said imbalance into children tree-nodes (only) in the case that (all) the computer-nodes have been (correctly) notified that said imbalance-inductor tree-node(s) is/are to be replicated. In such a situation, any insertion of a data-element into the imbalance-inductor node petitioned by any computer-node is requested to further include insertion (or triggering insertion of) the data-element into corresponding child node.

Such a replication and double insertion may cause that data-elements stored in the imbalance-inductor tree-node are further stored in children nodes of the imbalance-inductor node, which clearly enlarges the possibilities of how a given data-element may be queried. Indeed, different query plans may be defined to read same data-element(s) by accessing either the imbalance-inductor tree-node or corresponding child tree-node. Flexibility of data accesses is thus clearly improved in comparison with prior approaches.

The replication of the imbalance-inductor node and the double insertion once it has been confirmed that (all) computer-nodes have been (correctly) notified, may ensure also that any corrective action performed in the imbalance-inductor tree-node to compensate (or resolve) the imbalance condition will not imply any loss of data-elements. For example, if (permissible) storage capacity of the imbalance-inductor tree-node is overflowed, data-elements overflowing the imbalance-inductor tree-node may be removed therefrom without losing data-elements since all of them have been (previously) copied into children nodes. This copy into children nodes may have been performed through replication or double insertion. Reliability of data accesses is thus clearly improved in comparison with prior approaches.

It is also worthy of mention that no lock of any tree-node and/or computer-node is required with the proposed method, which implies an improved efficiency (of the method) in comparison with prior approaches. Since the replication and double insertion(s) are performed only if it is confirmed that (all) the computer-nodes have been notified, it is clear that no locks are required, and this necessarily implies improved efficiency.

The suggested replication(s) and double insertion(s) may also permit concurrent sub-queries to fulfil a requested query. In other words, since data-elements of the imbalance-inductor tree-node are replicated and double-inserted in a distributed manner between children nodes, query plan(s) targeting the imbalance-inductor tree-node may be substituted by concurrent sub-queries targeting all or part of the children nodes. It is also clear that such a concurrent execution of sub-queries targeting smaller (children) tree-nodes may be much more efficient than performing a complete query targeting the whole imbalance-inductor node.

The space-coordinates of a data-element may correspond to any value (uniquely or non-uniquely) identifying the data-element within the D-dimensional space. Details about this are provided in the detailed description.

The coordination and exchange of any type of data between computer-nodes may be implemented in any known manner with such a purpose or similar, such as e.g. through tailored notifications between computer-nodes, any known platform to manage distributed data-systems such as Apache Cassandra, etc. Details about these principles are provided in the detailed description.

Any of the tree-nodes may be considered overflowed if a logical storage capacity is exceeded. The imbalance condition may be satisfied when the first tree-node (or imbalance-inductor node) results overflowed. In particular, the imbalance condition may be satisfied when the imbalance-inductor node is overflowed and, furthermore, is to be read for replying a read request or query. In this last case, verifying whether the other computer-nodes have been notified may further include verifying whether the reading of the imbalance-inductor node has been completed before the other computer-nodes have been notified. Detailed information about these principles is disclosed in the detailed description.

Additionally or alternatively, the imbalance condition may result satisfied when a difference between replicated and non-replicated nodes at same tree-level and within same sub-tree is above a replication difference threshold. Details about this approach are disclosed in the detailed description.

A data-element may be understood as overflowing or non-overflowing a tree-node in which it is stored if the data-element is outside or within the logical storage capacity of the tree-node. This distinction may be implemented through e.g. a (random or pseudo-random) priority per data-element and a priority range per tree-node. If the data-element has priority within priority range of the tree-node, the data-element may be within logical storage capacity of the tree-node. If the data-element has priority outside priority range of the tree-node, the data-element may be outside logical storage capacity of the tree-node.

Tree-nodes may be created with initial priority range equal to widest range of priorities that are assignable to data-elements, so as to ensure that any data-element includable in the tree-node according to space coordinates also satisfies that its priority is within priority range of the tree-node. Optimization methods according to present disclosure (and in particular, the reorganization method) may further include adjusting the priority range of the balance-inductor tree-node to qualify the stored data-elements as overflowing or non-overflowing depending on whether their priority is outside or within priority range.

Optimization methods according to present disclosure (and in particular, the reorganization method) may further include, once the imbalance inductor tree-node has been replicated, removing from the imbalance-inductor tree-node those data-elements overflowing the tree-node, i.e. those data-elements with priority outside the (adjusted) priority range of the tree-node.

Detailed information about priorities per data-element and priority range per tree-node, and how said priorities and priority ranges may be calculated, adjusted and used to identify overflowing and non-overflowing data-elements is provided in the detailed description, along with the removal of overflowing data-elements.

In a second aspect, computer programs may be provided including program instructions for causing a computing system to perform any of the previous or similar methods of optimizing a distributed index. These computer programs may be embodied on a storage medium and/or carried on a carrier signal.

In a third aspect, computing systems may be provided for optimizing a distributed index. These computing systems may include a memory and a processor, embodying instructions stored in the memory and executable by the processor. The instructions may include functionality to execute any of the previous or similar methods of optimizing a distributed index.

In a fourth aspect, systems are provided that may be configured to perform any of the previous or similar methods of optimizing a distributed index. These systems may include an imbalance detector module configured to inspect the in-memory map stored at a first computer-node (in the plurality of computer-nodes) to determine whether the distributed index satisfies a storage imbalance condition caused by at least a first tree-node (or imbalance-inductor tree-node) stored in the first computer-node and, in said case, triggering a reorganization method implemented by a reorganization module. The reorganization module may include a notifier module and a replicator module.

The notifier module may be configured to notify to other computer-nodes in the plurality of computer-nodes that the imbalance-inductor tree-node is to be replicated, so as to enforce or provoke that any request from any of the other computer-nodes of inserting a data-element in the imbalance-inductor tree-node further includes (a request of) inserting the data-element in a child node of the first tree-node, depending on the space-coordinates of said data-element and the domain of said child node.

The replicator module may be configured to verify whether the other computer-nodes have been notified and, in said case, replicating the data-elements stored in the imbalance-inductor tree-node into children nodes of the imbalance-inductor tree-node depending on the space-coordinates of each of said data-elements and the domain of (each of) said children nodes.

In some examples, computer-nodes being or including any of the above or similar (computing) systems for optimizing a distributed system may also be provided. Distributed systems may also be provided including a plurality of such computer-nodes or similar connected to each other through a communication network.

In a fifth aspect, "insertion" methods may be provided for inserting a data-element into a distributed index in a distributed system including a plurality of computer-nodes that may be configured to perform previous optimizing methods or similar. Such insertion methods may include determining a series of updatable tree-nodes including an initial tree-node, one or more intermediate tree-nodes and a final tree-node, and inserting (or triggering insertion of) the data-element into each tree-node in the series of updatable tree-nodes satisfying that priority of the data-element to be inserted is within the priority range of the updatable tree-node.

The initial tree-node may be a tree-node closest to root tree-node, satisfying that space-coordinates and priority of the data-element to be inserted are/is within the domain and priority range, respectively, of said initial tree-node. The final tree-node may be a descendant node of the initial tree-node, satisfying that said final tree-node has not been replicated and space-coordinates of the data-element to be inserted are within the domain of said final tree-node. Each of the one or more intermediate tree-nodes may be a descendant node of the initial tree-node and an ancestor node of the final tree-node.

In a sixth aspect, computer programs may be provided including program instructions for causing a computing system to perform any of the previous or similar methods of inserting a data-element into a distributed index. These computer programs may be embodied on a storage medium and/or carried on a carrier signal.

In a seventh aspect, computing systems may be provided for inserting a data-element into a distributed index. These computing systems may include a memory and a processor, embodying instructions stored in the memory and executable by the processor. The instructions may include functionality to execute any of the previous or similar methods of inserting a data-element into a distributed index.

In an eighth aspect, "insertion" systems may be provided configured to perform any of the previous or similar methods of inserting a data-element into a distributed index. These systems may include a series-determiner module configured to determine a series of updatable tree-nodes including an initial tree-node, one or more intermediate tree-nodes and a final tree-node, and an inserter-module configured to insert (or to trigger insertion of) the data-element into each tree-node in the series of updatable tree-nodes and satisfying that priority of the data-element to be inserted is within priority range of said updatable tree-node.

The initial tree-node may be a tree-node closest to root tree-node, satisfying that space-coordinates and priority of the data-element to be inserted are/is within the domain and priority range, respectively, of said initial tree-node. The final tree-node may be a descendant node of the initial tree-node, satisfying that said final tree-node has not been replicated and space-coordinates of the data-element to be inserted are within the domain of said final tree-node. Each of the one or more intermediate tree-nodes may be a descendant node of the initial tree-node and an ancestor node of the final tree-node.

Functionality or functionalities implemented by the above series-determiner module and inserter-module may be performed at one of the computer-nodes, e.g. a first computer-node which is or includes the insertion system. In particular, the determination of the series of updatable tree-nodes may be performed by inspecting an in-memory map structurally defining the distributed index and being stored at said (first) computer-node.

In a ninth aspect, "querying" methods may be provided for replying a query by accessing a distributed index in a distributed system including a plurality of computer nodes that may be configured to perform previous or similar optimizing methods and/or previous or similar insertion methods. The query includes a domain scope defining one or more parts of the D-dimensional space to be consulted, and a proportion scope defining a proportional sample of the domain scope. At least some of the tree-nodes have a Depth attribute indicating a number of levels of descendant nodes of the tree-node forming together a perfect $2^D$-ary (sub-) tree with the tree-node as root of said perfect $2^D$-ary (sub-) tree.

These querying methods may include determining a tree-node in the tree-structure with smallest domain and best matching the domain scope of the query. This determination may be performed by one of the computer-nodes in the distributed system (e.g. first computer-node) by inspecting an in-memory map structurally defining the distributed index and being stored at said first computer-node. The querying methods may further include verifying (through inspection of in-memory map by first computer-node) whether the best matching tree-node has been replicated and, in said case, designating the best matching tree-node as starting node and, otherwise, determining an ancestor node of the best matching tree-node, which is closest to the best matching tree-node and has been replicated, and designating said replicated ancestor node as starting node.

The querying methods may still further include iteratively performing a loop until the (proportion scope of the) query is fulfilled. This loop may include determining (through inspection of in-memory map by first computer-node) a number of tree-levels to be jumped from the/each designated starting node, such that tree-nodes at the tree-level to be jumped to are estimated to include sufficient data-elements to fulfil the (proportion scope of the) query. The loop further may include determining (by first computer-node) a minimum value between the number of tree-levels to be jumped and the Depth of the starting node. This minimum value may be also denominated as minimum jump.

The loop still further may include verifying (by first computer-node) whether the minimum jump is greater than the Depth of the starting node (obtained from in-memory map) and, in said case, determining (through inspection of in-memory map by first computer-node) descendant nodes of the starting node that are at a distance from the starting node equal to the Depth of the starting node and designating (by first computer-node) said descendant nodes as new starting nodes to initiate a new iteration of the loop for each of said new starting nodes and, otherwise, performing (through inspection of in-memory map by first computer-node) the minimum jump from the starting node to a target tree-level and accessing (or triggering access to) tree-nodes at said target tree-level.

The loop yet further may include verifying (by first computer-node) whether the performed accesses have caused fulfilling of the (proportion scope of the) query and, in said case, quitting the loop and, otherwise, designating the accessed tree-nodes as new starting nodes to initiate a new iteration of the loop for each of said new starting nodes. Results of accesses locally performed at first computer-node may be accordingly gathered by first computer-node, and results of accesses performed at other computer-nodes may be received by first computer-node and gathered by first computer-node along with results of local accesses. The query may be confirmed as fulfilled or non-fulfilled depending on whole gathered results of local and remote accesses.

In z-order based implementations, the tree-node with smallest domain and best matching the (domain scope of the) query may be determined by selecting a tree-node with z-order identifier mostly coinciding with leftmost digits in target z-order value or values defined by the query. Details about this approach are provided in the detailed description.

In Depth attribute based implementations, the verification of whether the best matching tree-node has been replicated may be performed by verifying whether the best matching tree-node has either Depth equal to zero which means that the best matching tree-node has not been replicated, or Depth greater than zero which means that the best matching tree-node has been replicated. Details about Depth attribute and the verification of whether a tree-node has been replicated are provided in the detailed description.

Determining (from in-memory map) the number of tree-levels to be jumped from the/each designated starting node may include calculating a minimum number of nodes to be accessed to fulfil the domain scope and determining the number of tree-levels to be jumped depending on said minimum number of nodes to be accessed. The minimum number of nodes to be accessed may be calculated depending on the proportion scope of the query and a proportion of data-elements within the domain of the starting node that are stored in the starting node. The proportion of data-elements within the starting node's domain that are stored in the starting node may be calculated depending on widest range of priorities that are assignable to data-elements and a proportion or part of the widest range of assignable priorities covered by the priority range of the tree-node. Detailed information about all these principles are provided in the detailed description.

In a tenth aspect, computer programs may be provided including program instructions for causing a computing system to perform any of the previous or similar querying methods. These computer programs may be embodied on a storage medium and/or carried on a carrier signal.

In an eleventh aspect, computing systems may be provided for replying a query. These querying computing systems may include a memory and a processor, embodying instructions stored in the memory and executable by the processor. The instructions may include functionality to execute any of the previous querying methods or similar.

In a twelfth aspect, querying systems may be provided that are configured to perform any of the previous or similar querying methods. These querying systems may include a matcher module, a starter module, an iterator module, a jumper module, a minimum-determiner module, a re-starter module and a fulfil-determiner module implementing together previous or similar methods of replying a query by accessing a distributed index in a distributed system.

BRIEF DESCRIPTION OF THE DRAWINGS

Non-limiting examples of the present disclosure will be described in the following, with reference to the appended drawings, in which:

FIG. 7 is a flow chart schematically illustrating methods of reading or querying data-elements from a distributed index according to examples.

DETAILED DESCRIPTION OF EXAMPLES

Figure 1:
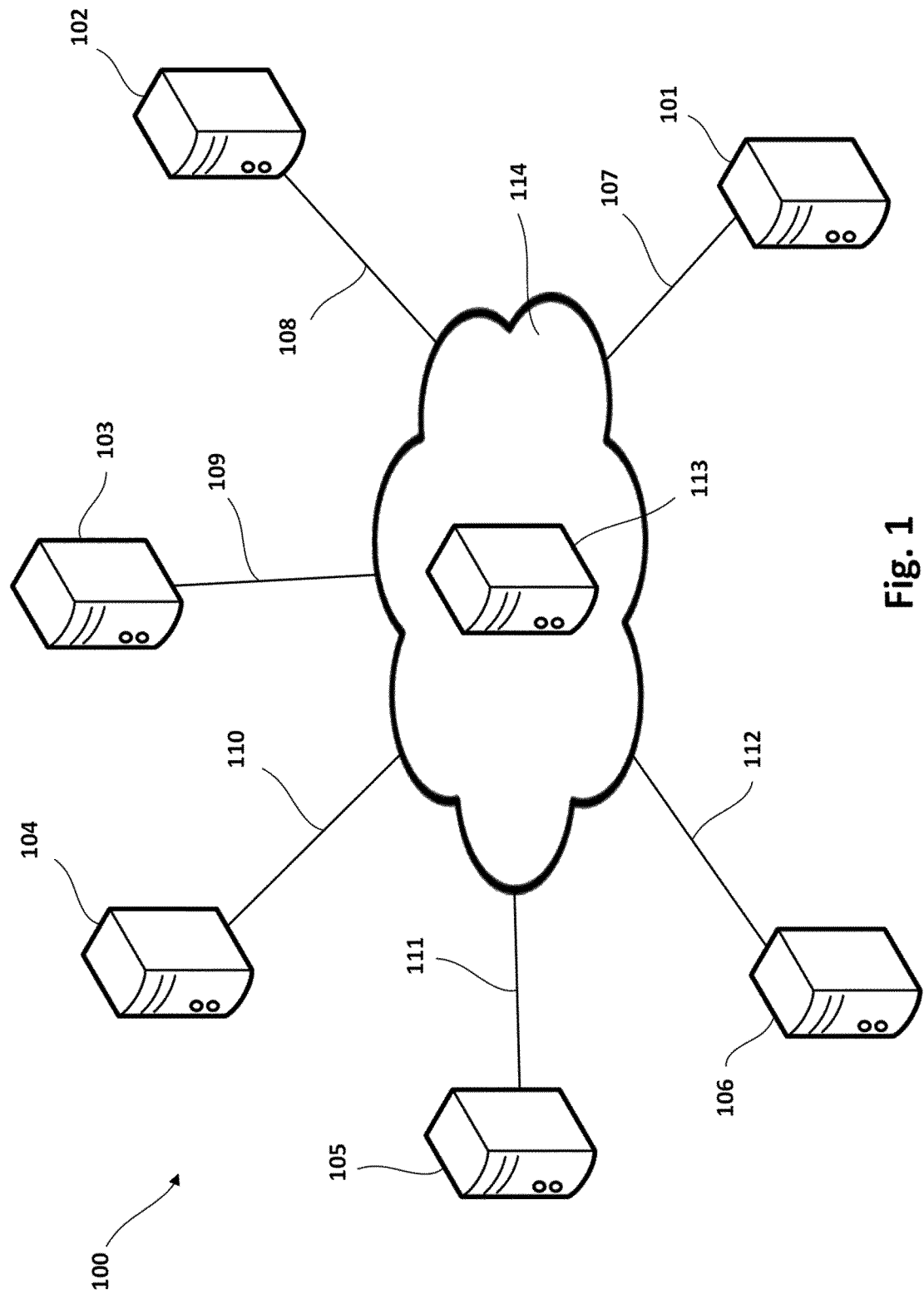
FIG. 1 is a block diagram schematically illustrating distributed systems suitable for storing and optimizing a distributed index by performing optimization methods according to examples.

FIG. 1 is a block diagram schematically illustrating distributed systems suitable for storing and optimizing a distributed index by performing optimization methods according to examples. As shown in the figure, such distributed systems 100 may include a plurality of computer-nodes 101-106 connected to (or in communication with) each other through e.g. a communications network 114, such as Internet or similar. The computer-nodes 101-106 may include respective connections 107-112 to the Internet or similar network 114. In particular, each of the computer-nodes 101-106 may be configured to store one or more tree-nodes of the distributed index, an in-memory map structurally defining the distributed index, etc. and may include a (computing) system configured to optimize the distributed index. More specifically, each of said (computing) systems may be configured to optimize those tree-nodes that are stored in the computer-node including the (computing) system. Distributed systems according to FIG. 1 may further include an intermediate system/server 113 configured to intermediate between the computer-nodes 101-106 of the distributed system 100. Said intermediation may include e.g. automatically updating the in-memory maps with any structural change occurred in the distributed index, any kind of communication/notification between computer-nodes, etc.

Figure 2:
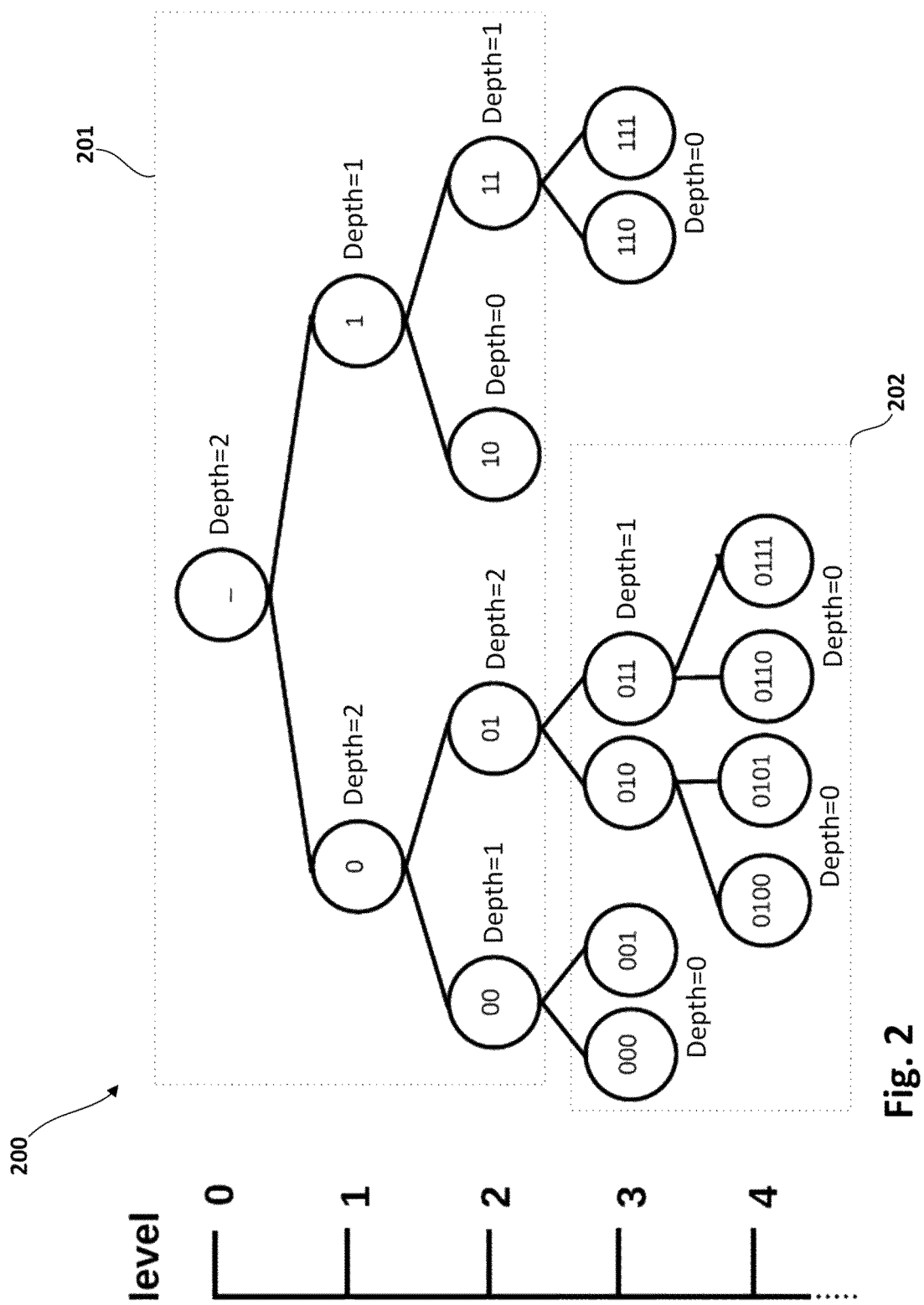
FIG. 2 is a schematic illustration of tree structures suitable for distributed indexes that are optimizable by performing optimizing methods according to examples.

FIG. 2 is a schematic illustration of tree structures suitable for distributed indexes that are optimizable by performing (optimizing) methods according to examples. As shown in the figure, such tree structures may include a plurality of tree-nodes (circles labelled with '_' to '0111') including a root node (circle labelled with '_'), a plurality of non-root nodes (remaining circles labelled with '0' to '0111') and parent-child relations between the tree-nodes. For example, root node '_' has two children nodes '0' and '1', tree-node '0' has two children nodes '00' and '01', tree-node '1' has two children nodes '10' and '11', tree-node '00' has two children nodes '000' and '001', etc.

The root node '_' may cover a D-dimensional space (or domain), and each of the non-root nodes '0'-'0111' covers a part of the D-dimensional space (or domain) such that each of the non-root nodes with same parent node covers a partition of the whole or part of the D-dimensional space covered by said parent node. Such domain partitions may be disjoint or (slightly) overlapping partitions. For the sake of simplicity, the particular tree structure shown is based on one-to-two parent-children relations, i.e. corresponding to a one-dimensional space: $2^{Dimensions}=2^1=2$ children per parent. A tree-structure aimed at representing a 3D (three-dimensional) space, would be based on one-to-eight parent-children relations: $2^D=2^3=8$ children per parent.

Each of the tree-nodes may store one or more data-elements (e.g. data records, rows, data arrays, data sets, etc.) each having space-coordinates within the whole or part of the D-dimensional space covered by the tree-node (or domain of the tree-node) in which the data-element is stored. The space-coordinates of a data-element may correspond to e.g. spatial coordinates of a key value, unique identifier, or any combination of attributes of the data-element designating or pointing to a particular location in the D-dimensional space characterizing or identifying the data-element within the D-dimensional space. In some examples, a z-order function may be defined to produce a z-order identifier (e.g. a sequence of 0 and 1) depending on the space-coordinates of the data-element. The z-order based identifier may correspond to an either unique or non-unique identifier of the data-element. Z-order identifiers may also be defined to identify tree-nodes and corresponding domain covered by the tree-node. Any data-element may be stored in any of the tree-nodes whose z-order identifier matches a sub-sequence of leftmost bit(s) of the z-order identifier of the data-element. Taking into account the particular example shown, a data-element with z-order identifier '01110101001 . . . ' may be stored in one or more of the tree-nodes with following z-order identifiers: '0', '01', 011' and "0111'.

The whole or part of the D-dimensional space covered by a tree-node may also be denominated as the domain of the tree-node. In a parent-children relation, the domain of the parent tree-node may be equal to the union of the (disjoint or—slightly—overlapping) domains of the children tree-nodes. In other words, the domains of the children tree-nodes may be either non-intersecting or (slightly) intersecting domains whose union coincides with the domain of the parent node.

Distributed indexes according to FIG. 2 may be included in a distributed system such as the ones described with reference to FIG. 1, wherein each of the tree-nodes '_'-'0111' may be stored at one of the computer-nodes 101-106 along with an in-memory map structurally describing the (whole) distributed index.

Tree-structures that are optimizable by methods according to present disclosure may include different levels of tree-nodes: tree-level 0 to tree-level 4 . . . . Such tree-structures may e.g. be based on parent-children relations wherein each of the tree-nodes has either zero children or $2^D$ children (i.e. $2^1$ children in the particular example shown). Taking this into account, each of the tree-nodes having $2^D$ children may be seen as a root of a perfect $2^D$-ary tree with two or more tree-levels. For example, the nodes with identifiers '_', '0', '1', '00', '01', '10' and '11' form a perfect 2-ary tree 201 with three tree-levels (levels 0, 1 and 2) and the tree-node '_' as root node. Another example may be the sub-tree formed by the nodes with identifiers '01', '010', '011', '0100', '0101', '0110' and '0111', which has three tree-levels (levels 2, 3 and 4) and the node '01' as root node of a perfect 2-ary tree.

In the aforementioned z-order based approach, the parent-children relations may be identified by the z-order identifiers attributed to the tree-nodes. For example, any child tree-node may have an identifier equal the identifier of its parent tree-node concatenated with D bit(s) at the right of the identifier of its parent tree-node, D being the number of dimensions of the D-dimensional space. In the particular example shown in FIG. 2, the right D bit(s) is only one bit because it is a 2-ary tree structure ($2^D=2^1=$2-ary tree). In a 4-ary tree structure, the right D bit(s) would be 2 bits ($2^D=2^2=$4-ary tree); in an 8-ary tree structure, the right D bit(s) would be 3 bits ($2^D=2^3=$8-ary tree); etc.

Each of the tree-nodes that are root of a perfect $2^D$-ary (sub-) tree may have an associated Depth of the perfect $2^D$-ary (sub-) tree. For instance, the node '_' is shown having a Depth of 2 which is indicated in the figure with 'Depth=2' and means that the node '_' has two levels of "descendant" nodes forming the perfect 2-ary (sub-) tree 201. A tree-node with Depth equal to zero may indicate that the tree-node has not been replicated. A tree-node with Depth greater than zero may indicate that the tree-node has been replicated. Depth may thus be used to know whether the tree-node has been replicated. The replication of tree-nodes is further discussed with reference to other figures.

Tree-structured indexes according to FIG. 2 (or similar) may suffer from imbalance situations as new data-elements are inserted and the tree structure 200 is reorganized by (optimizing) methods according to present disclosure. An imbalance condition may include e.g. an overflowing of a tree-node. The tree-nodes of the tree structure may have a real storage capacity and a permissible storage capacity smaller than the real storage capacity. The permissible storage capacity may have been established to ensure an efficient operation of the tree-node in terms of e.g. read and/or write accesses to the tree-node. The permissible storage capacity may be such that any quantity of data (-elements) above it may degrade efficiency of accesses to the tree-node and/or, in general, management of the tree-node. In some examples, a tree-node exceeding its permissible storage capacity may be denominated herein as an overflowed tree-node or, in other words, a tree-node affected by imbalance (overflowing) condition, etc.

In some examples, such an overflowing state of the tree-node may not suffice to cause satisfaction of the imbalance condition, but it may be furthermore required that the tree-node is to be read for e.g. responding to a read or query request. An overflowed tree-node may not cause any performance degradation of the index while the tree-node is not read. Hence, it may be convenient to assume the imbalance condition as satisfied when it is further detected that an overflowed tree-node is to be read.

Alternatively or additionally to the above overflowing-based condition(s), the imbalance situation may include an imbalance in a sub-tree of the tree-structure 200 in terms of replicated tree-nodes, in terms of performed reads, etc.

An imbalance in terms of replicated tree-nodes may refer to e.g. an "inacceptable" difference between replicated and non-replicated tree-nodes at same tree-level within same sub-tree of the tree-structure 200. FIG. 2 illustrates an example of such "replicated-nodes depending" imbalance in the portion 201 of the tree-structure 200. Tree-nodes '000' and '001' are shown not replicated and tree-nodes '010' and '011' are shown replicated, said tree-nodes '000'-'011' being at same tree-level and within same sub-tree whose root is the tree-node '0'. Upon detection of said imbalance condition, it could be convenient to replicate the tree-nodes '000' and '001' in order to provide a more equilibrated sub-tree structure. The difference between replicated and non-replicated tree-nodes may be determined as inacceptable or correctable depending on e.g. whether said difference is above or below a (predefined) replicated-nodes difference threshold. The replication of tree-nodes '000' and '001' would cause the tree-node '0' to change its Depth from 2 to 3, the tree-node '00' to change its Depth from 1 to 2, the tree-node '000' to change its Depth from 0 to 1, and the tree-node '001' to change its Depth from 0 to 1.

Another situation that may be considered as causing satisfaction of the imbalance condition may be an imbalanced number of reads performed at a particular portion of a sub-tree in the tree structure 200, said portion including one or more tree-nodes that have not been yet replicated. This condition may be similar to the imbalance in terms of replicated nodes but, in this case, taking into account the number of performed reads at tree-nodes that have not been already replicated). If a large number of reads performed at non-replicated tree-nodes is detected, it may be convenient to replicate one or more of said non-replicated tree-nodes. Said number of performed reads may be determined as excessive (and, hence, compensable) depending on e.g. whether said number of reads is above or below a (predefined) performed-reads threshold.

A further situation that may be considered as causing satisfaction of the imbalance condition may include detection of a significant number of accesses to specific tree-node(s) and, in particular, to (small) region(s) in the domain of said specific tree-node(s). In this case, it may be convenient to replicate said specific tree-node(s) into corresponding $2^D$ children nodes including "special" children nodes with domains depending on the detected mostly accessed (small) domain region(s). Each of the mostly accessed domain regions may originate corresponding (new) child node with domain corresponding to mostly accessed domain region of the parent. This way, accesses (highly) concentrated in particular domain regions (of the parent) may be optimized in the sense that said accesses may be performed into much smaller tree-nodes (i.e. new children nodes restricted to mostly accessed domain regions).

Still with reference to FIG. 2, the tree-nodes may have a priority range and the data-elements stored in the tree-nodes may have a priority. The priority of a data-element may be a random or pseudo-random priority which may be calculated (e.g. at insertion time) by applying a hash-function to at least part of the data-element (to be inserted). In particular, the priority of a data-element may be calculated by applying the hash-function to a unique identifier or key (value) or the whole or part of the data-element.

The priority range of a given tree-node may define which of the data-elements in the tree-node is/are within or outside the permissible storage capacity depending on whether the priority of the data-element is within or outside the priority range of the tree-node. A data-element having a priority within the priority range may indicate that the data-element is within the permissible storage capacity or, in other words, the data-element is not an overflowing data-element. A data-element with a priority outside the priority range may indicate that the data-element is outside the permissible storage capacity or, in other words, the data-element is an overflowing data-element. Any tree-node not exceeding its permissible storage capacity may have a priority range equal to widest range of priorities that are assignable to data-elements, to ensure that the priority of any data-element includable in the tree-node (depending on its space-coordinates or z-order identifier) is within the priority range of the tree-node. For example, if priorities of data-elements are generally defined to be between 0 and 1, the priority range of a non-overflowed tree-node may be a range between 0 and 1.

In some examples, the priority range of a tree-node may be a top-priority defining that any of the data-elements in the tree-node with priority below the top-priority is within the permissible storage capacity and, otherwise, is outside the permissible storage capacity. Any tree-node not exceeding its permissible storage capacity may have top-priority equal to maximum or highest priority assignable to data-elements, so as to ensure that the priority of any data-element included or includable in the tree-node (depending on its space-coordinates or z-order identifier) is below the top-priority of the tree-node. Any data-element with priority below the top-priority of the tree-node in which the data-element is included (or includable) may be denominated as non-overflowing data-element. Any data-element with priority above the top-priority of the tree-node in which the data-element is included (or includable) may be denominated as overflowing data-element.

Alternatively or additionally to the top-priority approach, the priority range of a tree-node may be a bottom-priority defining that any of the data-elements in the tree-node with priority above the bottom-priority is within permissible storage capacity and, otherwise, is outside the permissible storage capacity. Any tree-node not exceeding its permissible storage capacity may have bottom-priority equal to minimum or lowest priority assignable to data-elements, so as to ensure that the priority of any data-element included or includable in the tree-node (depending on its space-coordinates or z-order identifier) is above the bottom-priority of the tree-node. Any data-element with priority above the bottom-priority of the tree-node in which the data-element is included (or includable) may be denominated as non-overflowing data-element. Any data-element with priority below the bottom-priority of the tree-node in which the data-element is included (or includable) may be denominated as overflowing data-element.

In implementations with tree-nodes having top-priority and bottom-priority, any of the data-elements in the tree-node with priority between bottom-priority and top-priority is within the permissible storage capacity and, otherwise, is outside the permissible storage capacity. Any tree-node not exceeding its permissible storage capacity may have bottom-priority equal to minimum or lowest priority assignable to data-elements and top-priority equal to maximum or highest priority assignable to data-elements, so as to ensure that the priority of any data-element included or includable in the tree-node (depending on its space-coordinates or z-order identifier) is between bottom-priority and top-priority of the tree-node. Any data-element with priority between bottom-priority and top-priority of the tree-node in which the data-element is included (or includable) may be denominated as non-overflowing data-element. Any data-element with priority not between bottom-priority and top-priority of the tree-node in which the data-element is included (or includable) may be denominated as overflowing data-element.

Once a tree-node causing satisfaction of an imbalance condition (i.e. imbalance-inductor tree-node) has been detected, the priority range of the tree-node may be adjusted according to the permissible storage capacity of the imbalance-inductor tree-node. The priority range may be updated to provoke that those data-elements in the imbalance-inductor tree-node with priority within the updated priority range are non-overflowing data-elements, and those data-elements in the imbalance-inductor tree-node with priority outside the updated priority range are overflowing data-elements. This may be achieved, for example, by sorting the existing priorities in the imbalance-inductor tree-node, and selecting new top-priority and/or new bottom-priority covering a part of the sorted priorities that correspond to a quantity of data-elements fitting the permissible storage capacity. A first option may be selecting only (new) top-priority so that data-elements with priority below the (new) top-priority are non-overflowing data-elements, and data-elements with priority above the (new) top-priority are overflowing data-elements. A second option may be selecting only (new) bottom-priority so that data-elements with priority above the (new) bottom-priority are non-overflowing data-elements, and data-elements with priority below the (new) bottom-priority are overflowing data-elements. A third option may be selecting both (new) bottom-priority and (new) top-priority so that data-elements with priority between (new) bottom-priority and (new) top-priority are non-overflowing data-elements, and data-elements with priority not between (new) bottom-priority and (new) top-priority are overflowing data-elements.

The priority range of any tree-node may be used to estimate a quantity (or proportion) of data-elements within the domain of the tree-node that are stored in the tree-node. In implementations based on only top-priority, a percentage of stored data-elements may be calculated depending on a difference between the top-priority of the tree-node and the minimum or lowest priority assignable to data-elements. For example, if priority assignable to data-elements is between 0 and 1 and top-priority of the tree-node is 0.1, this may imply that a 10% of the data-elements within the domain of the tree-node are stored in the tree-node. In implementations based on only bottom-priority, a percentage of stored data-elements may be calculated depending on a difference between the bottom-priority of the tree-node and the maximum or highest priority assignable to data-elements. For example, if priority assignable to data-elements is between 0 and 1 and bottom-priority of the tree-node is 0.8, this may imply that a 20% of the data-elements within the domain of the tree-node are stored in the tree-node. In implementations based on top-priority and bottom-priority, a percentage of stored data-elements may be calculated depending on a difference between top-priority and bottom-priority of the tree-node. For example, if priority assignable to data-elements is between 0 and 1 and difference between top-priority and bottom-priority is 0.15, this may imply that a 15% of the data-elements within the domain of the tree-node are stored in the tree-node. This estimated proportion of data-elements within the domain of the tree-node that are stored in the tree-node may be very useful to perform read queries and, in particular, approximate queries. Details about how such estimated proportions may be used are provided in other parts of the description.

Figure 3:
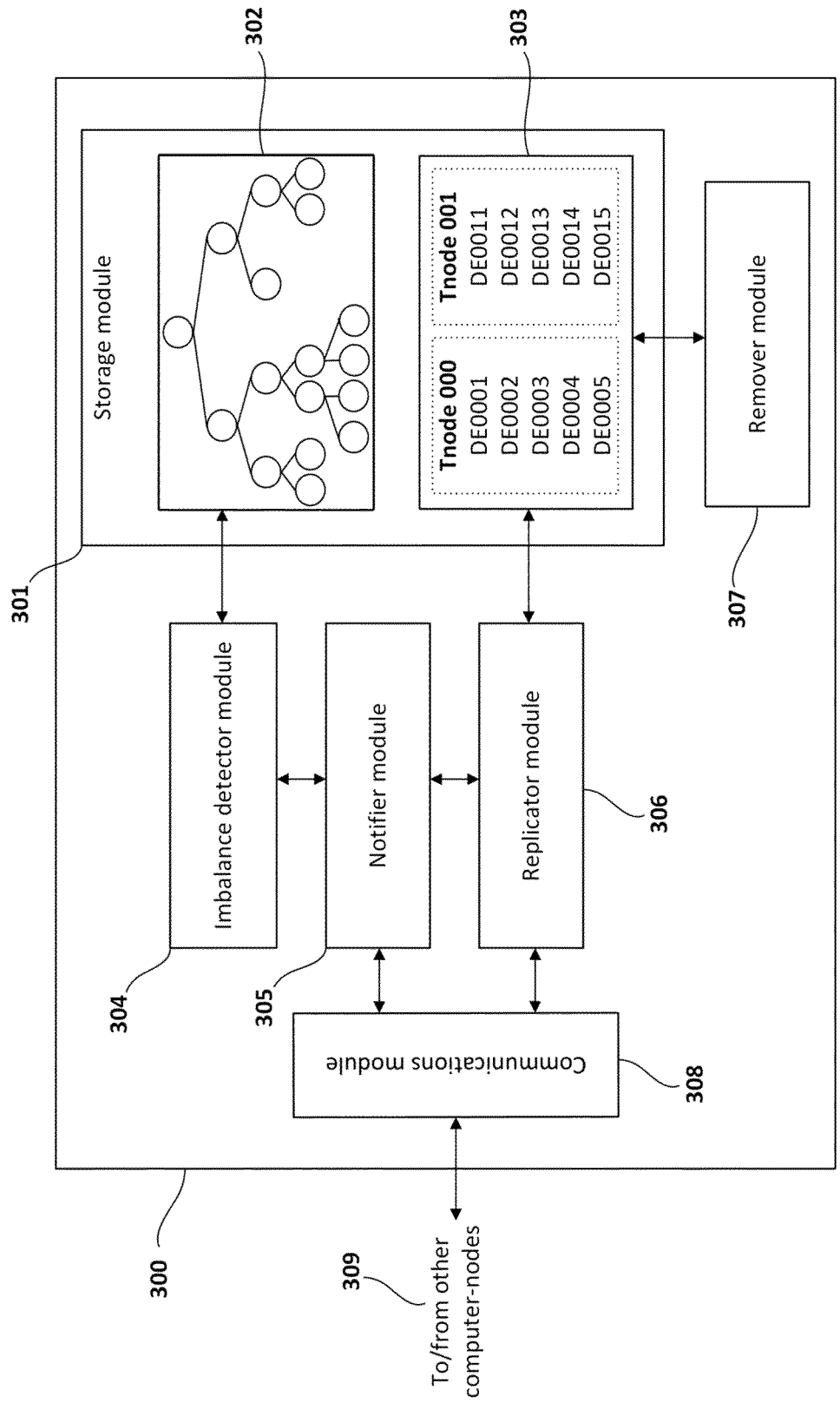
FIG. 3 is a block diagram schematically illustrating at least part of a computer-node (of a distributed system) configured to perform optimizing methods according to examples.

FIG. 3 is a block diagram schematically illustrating at least part of a computer-node 300 (of a distributed system) configured to optimize a distributed index, according to examples. As shown in the figure, said (optimizing) system 300 may include a storage module 301, a communications module 308, an imbalance detector module 304, a notifier module 305, a replicator module 306, etc. The distributed index to be optimized may be stored in a distributed system such as e.g. the one of FIG. 1, and may have a tree-structure such as e.g. the one of FIG. 2. Reference signs from FIG. 1 or 2 may be re-used in following description of FIG. 3 for the sake of better exposition.

The (optimizing) system 300 may correspond to or may be disposed in any one of the computer-nodes 101-106 of the distributed system 100. In particular, all the computer-nodes 101-106 of the distributed system 100 may be or may form an (optimizing) system according to principles discussed with respect to system 300.

The storage module 301 may be configured to store an in-memory map 302 structurally describing the distributed index 200, one or more of the tree-nodes 303 of the distributed index 200, etc. In the particular example illustrated, the storage module 301 stores data defining a tree structure equal or similar to the structure 200, and tree-nodes '000' and '001' of said structure 200, along with data-elements included in said tree-nodes DE0001-DE0005 and DE0011-DE0015, respectively.

The in-memory map 302 may be (continuously or regularly or opportunistically) fed with structural updates of the tree-structure 200 due to insertions and/or replications performed at any of the computer-nodes in the distributed system 100. The term 'continuously' may mean that the in-memory map 302 is fed with a structural change when said change occurs. The term 'regularly' may mean that the in-memory map 302 is fed under a predefined frequency, in which case several structural changes occurred at different times may be "transferred" to the in-memory map 302 at same time (under predefined frequency). The term "opportunistically" may mean that the in-memory map 302 is fed when any other type of communication (or transfer) is required and one or more "pending" updates of the in-memory map 302 may be included in said other communication or transfer. Any known technique aimed at distributing and/or synchronizing data among different computer-nodes in a distributed system 100 may be used. This distribution technique may be implemented through e.g. tailored notifications between computer-nodes, any known platform to manage distributed data-systems such as Apache Cassandra, etc.

Structural updates of the tree-structure 200 may be reflected in the in-memory map 302 through suitable metadata representing any of the structural aspects described in other parts of the disclosure. Examples of said structural aspects may be the Depth per tree-node (see FIG. 2), the priority range per tree-node, reads-to-time ratio per tree-node, etc.

In some examples, the in-memory map 302 may further include an approximate membership checker, such as e.g. a Bloom filter or similar, to determine whether a tree-node has not been replicated. This filter may include e.g. an array of replication indicators with two possible values, one of them indicating 'performed replication' and the other one indicating 'unperformed replication'. Given a particular tree-node, this array may be accessed by e.g. calculating a numeric hash value from the tree-node's identifier (e.g. z-order identifier as discussed with reference to FIG. 2), applying a MOD function returning the remainder of dividing the numeric hash value by the length of the array, and accessing the array using the returned remainder as index of the array. If the accessed position of the array indicates unperformed replication, it may be assumed with full reliability that the tree-node has not been replicated. If the accessed position of the array indicates performed replication, it means that the tree-node could have been replicated but it may be a false positive. Different tree-nodes may collide in same position of the array, since said different tree-nodes may result in same output of the MOD function and, therefore, same index of the array. Such collisions may cause false positives in the sense that a non-replicated tree-node may "point" to a position of the array that has been previously updated with 'performed replication' in relation to another tree-node that has been replicated.

Taking into account the above approximate membership checker, methods according to present disclosure may use it instead of consulting detailed metadata to determine whether a tree-node has not been replicated. Of course, methods according to present disclosure may also include updating the approximate membership checker according to replications that are being performed. The use of such an approximate membership checker may permit avoiding big amounts of metadata in the in-memory map 302 and corresponding updating and reading, which may provide improved efficiency to methods according to present disclosure. Details of how the approximate membership checker may be used are provided in other parts of the description.

The communications module 308 may be configured to perform necessary communication functions for sending/receiving data to/from other computer-nodes 309 in the distributed system 100. The communications module 308 may thus be used by other modules in the system (or computer-node) 300 to interchange data with other computer-nodes 309 in the distributed system 100. For instance, the notifier module 305 and the replicator module 306 may use the communications module 308 to exchange data with other computer-nodes 309 in the manners described in other parts of the disclosure.

The imbalance detector module 304 may be configured to inspect the in-memory map 302 for determining whether the distributed index 200 satisfies a storage imbalance condition caused by at least one of the tree-nodes stored in the computer-node 300. This "imbalance-inductor" tree-node may be any one of the tree-nodes 'Tnode 000' or 'Tnode 001'. The imbalance condition may refer to any combination of the situations described with reference to FIG. 2, such as e.g. overflowed tree-node, imbalanced sub-tree in terms of replicated nodes and/or in terms of mostly accessed data-elements or domain portions, etc. The "imbalance-inductor" tree-node may be a single tree-node or several tree-nodes stored in the computer-node 300.

The notifier module 305 may be configured to notify to the other computer-nodes 309 that the imbalance-inductor node(s) is to be replicated, so as to enforce or provoke that any request from any of the other computer-nodes 309 of inserting a data-element in the imbalance-inductor node includes (a request of) inserting the data-element in one or another child node of the imbalance-inductor node, depending on whether the space-coordinates (or z-order identifier) of the data-element fits within the domain (or z-order identifier) of the one or the other child node.

The replicator module 306 may be configured to verify whether the other computer-nodes 309 have been (correctly) notified and, in said case, to replicate the imbalance-inductor node into its children nodes. This verification may be performed by determining whether a reply (or ACK) to the notification has been received from (each of) the other computer-nodes 309, in which case the replicator module 306 may assume that the other computer-nodes 309 have been (correctly) notified. The replication may include copying each of the data-elements stored in the imbalance-inductor node into one or another child node of the imbalance-inductor node, depending on whether the space-coordinates (or z-order identifier) of the data-element fits within the domain (or z-order identifier) of the one or the other child node.

Replication(s) into any child node stored in the storage module 301 of the computer-node 300 may be performed locally by the replicator module 306. Replication(s) into any child node stored in any of the other computer-nodes 309 may include sending (by the replicator module 306 through the communications module 308) a replication request instructing the other computer-node 309 (at which the child node is stored) to perform the required replication. The replication may further include creating corresponding child/children node(s) in case of nonexistence thereof when the replication of data-elements is to be performed. In said case, if some replication request(s) is/are sent, replication request(s) may further instruct corresponding computer-node(s) 309 to create corresponding child/children node(s).

Such a creation of the children nodes may attribute corresponding domain to each of the new children nodes depending on e.g. domain-attribution criteria. The domain of the imbalance-inductor node may be divided into (disjoint or—slightly—overlapping) parts and each of said parts may be assigned to one of the created children nodes, such that the union of said domains of the new children nodes coincides with the domain of the imbalance-inductor node. The domain-attribution criteria may include e.g. defining equally sized domain-parts, differently sized domain-parts depending on operational parameters, differently sized domain-parts depending on functional parameters, or any other known principle with same or similar purpose.

Operational parameters may include e.g. forecasted accesses to different domain sections. Such a forecasting may depend on e.g. historical counting of performed accesses, which may be obtained from e.g. an activity log of the distributed system or of corresponding computer-node. A small domain section or part that is frequently accessed may be assigned to one of the children nodes (of the imbalance-inductor node) to improve efficiency of accesses to said small domain part. The smaller a domain part and more frequently accessed, the more efficiently may be accessed said domain part if it corresponds to a particular tree-node. Differently sized (disjoint or—slightly—overlapping) domain-parts may be defined depending on access frequency and smaller or larger size of the domain part. Functional parameters may refer to e.g. a functional profile or nature of the data-elements to be accessed. Differently sized domain-parts may be defined depending on such a functional profile or nature, so as to promote functional "clustering" of data-elements in newly created children nodes.

Creating the children nodes may further include attributing widest priority range to each of the newly created children nodes. For example, lowest and/or highest priority assignable to data-elements may be designated as bottom-priority and/or top-priority of the tree-node, respectively, so as to ensure that priority of any data-element includable in the new tree-node (depending on its space-coordinates or z-order identifier) is within priority range of the newly created tree-node.

Once the replication of the imbalance-inductor node has been completed, ancestor nodes of the imbalance-inductor node may be notified about said fact, so that each of said ancestor nodes may update its Depth attribute accordingly. In-memory maps (structurally describing the index 200) in any of the participating systems (computer-nodes, client-nodes, etc.) may be correspondingly updated with new Depth value(s).

Systems or computer-nodes according to present disclosure may further include a remover module 307 configured to remove from the imbalance inductor tree-node overflowing data-elements, once it has been confirmed that the replication of the imbalance inductor node has been completed. The selection of the overflowing data-elements (to be removed) may be implemented according to different criteria, such as e.g. the priority depending criteria described with reference to FIG. 2.

When a new tree-node is to be created, it may be stored either in same computer-node hosting its parent node or in another computer-node. This decision may be taken by e.g. a creator module (not shown) depending on a diversity of criteria, such as e.g. loading criteria, randomness criteria, or any other known principles aimed at distributing computational effort among different computer-nodes in a distributed system.

Loading criteria may include e.g. verifying whether the computer-node storing the parent node of the tree-node (to be created) is excessively or non-excessively loaded. In case of excessive load, the new tree-node may be created in a less loaded computer-node or, otherwise, in the computer-node storing the parent node (since it is not excessively loaded). A computer-node may be overloaded or not depending on whether computational resources (such as e.g. memory, processor, etc.) in the computer-node are at or close to maximum or critical computational capacity. For example, if large amounts of memory (e.g. RAM, disk, etc.) are used (i.e. unavailable) the new tree-node may be created in a less loaded computer-node. Predefined thresholds may be used to verify whether a computer-node is excessively or non-excessively loaded. A memory threshold may indicate an amount of used memory above which the computer-node may be qualified as overloaded; a processing threshold may indicate a processing capacity above which the computer-node may be considered overloaded, etc.

Randomness criteria may include calculating a random value from an identifier of the tree-node to be created, and determining a computer-node in which the tree-node may be created depending on said random value. Calculating said random value may include applying a hash function to the identifier of the tree-node. The output of the hash function (i.e. hash value) may be inputted to a MOD function returning the remainder of dividing the hash value by the number of computer-nodes in the distributed system. The output of the MOD function may be a number corresponding to an identifier of a computer-node in which the new tree-node may be created. Identifiers of tree-nodes may be e.g. z-order based identifiers or similar, such as the ones discussed with reference to FIG. 2. Similar foundations may be used in relation to identifiers of computer-nodes. These "distribution" principles may be implemented through any known technique purposed at that, such as e.g. tailored approaches, any known platform to manage distributed data-systems such as Apache Cassandra, etc.

Figure 6:
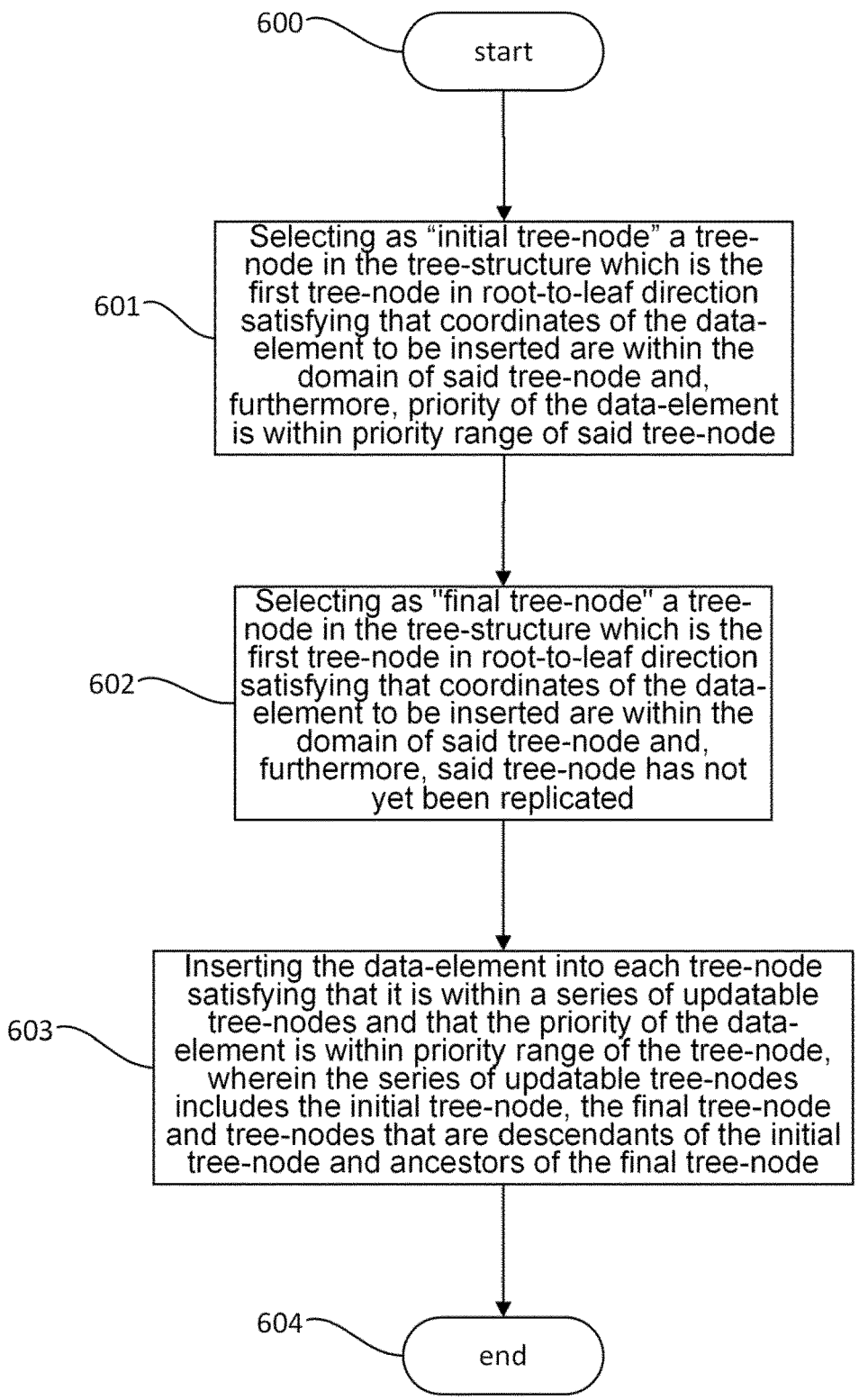
FIG. 6 is a flow chart schematically illustrating methods of inserting a data-element in a distributed index according to examples.

Systems or computer-nodes according to present disclosure may further include an insertion module (not shown in FIG. 3) configured to perform insertion methods according to e.g. FIG. 6 or similar, and/or a reading module (not shown in FIG. 3) configured to perform reading (or querying) methods according to e.g. FIG. 7 or similar.

As used herein, the term "module" may be understood to refer to software, firmware, hardware and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the described particular module.

Moreover, the modules may be implemented across multiple devices, associated or linked to the optimizing (or inserting or querying) system or computer-node 300, and/or other components that may be local or remote to one another. Additionally, the modules may be moved from one device and added to another device, and/or may be included in both devices, associated to the optimizing (or inserting or querying) system or computer-node 300. Any software implementations may be tangibly embodied in one or more storage media, such as e.g. a memory device, a floppy disk, a compact disk (CD), a digital versatile disk (DVD), or other devices that may store computer code.

Any optimizing (or inserting or querying) (computing) system (or computer-node) 300 according to present disclosure may be implemented by computing devices or systems, electronics or a combination thereof. The computing devices or systems may be or include a set of instructions (that is, a computer program) and then the optimizing (or inserting or querying) (computing) system (or computer-node) 300 may include a memory and a processor, embodying said set of instructions stored in the memory and executable by the processor. The instructions may include functionality to execute optimizing (or inserting or querying) methods such as e.g. the ones described with reference to FIGS. 4 and 5 (or FIG. 6 or 7).

In case the optimizing (or inserting or querying) (computing) system (or computer-node) 300 is implemented only by electronics, a controller of the system may be, for example, a CPLD (Complex Programmable Logic Device), an FPGA (Field Programmable Gate Array) or an ASIC (Application-Specific Integrated Circuit).

Figure 4:
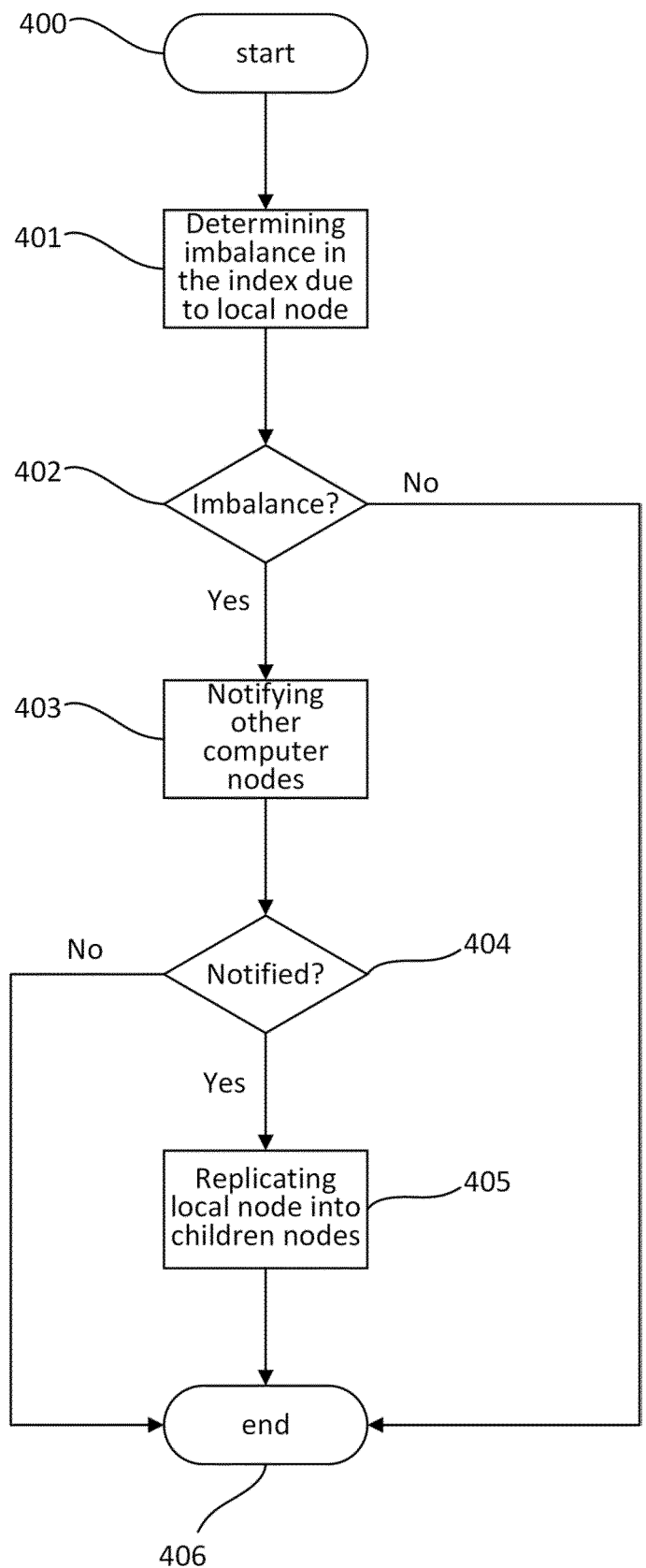
FIG. 4 is a flow chart schematically illustrating (optimizing) methods for optimizing a distributed index, according to examples.
Figure 5:
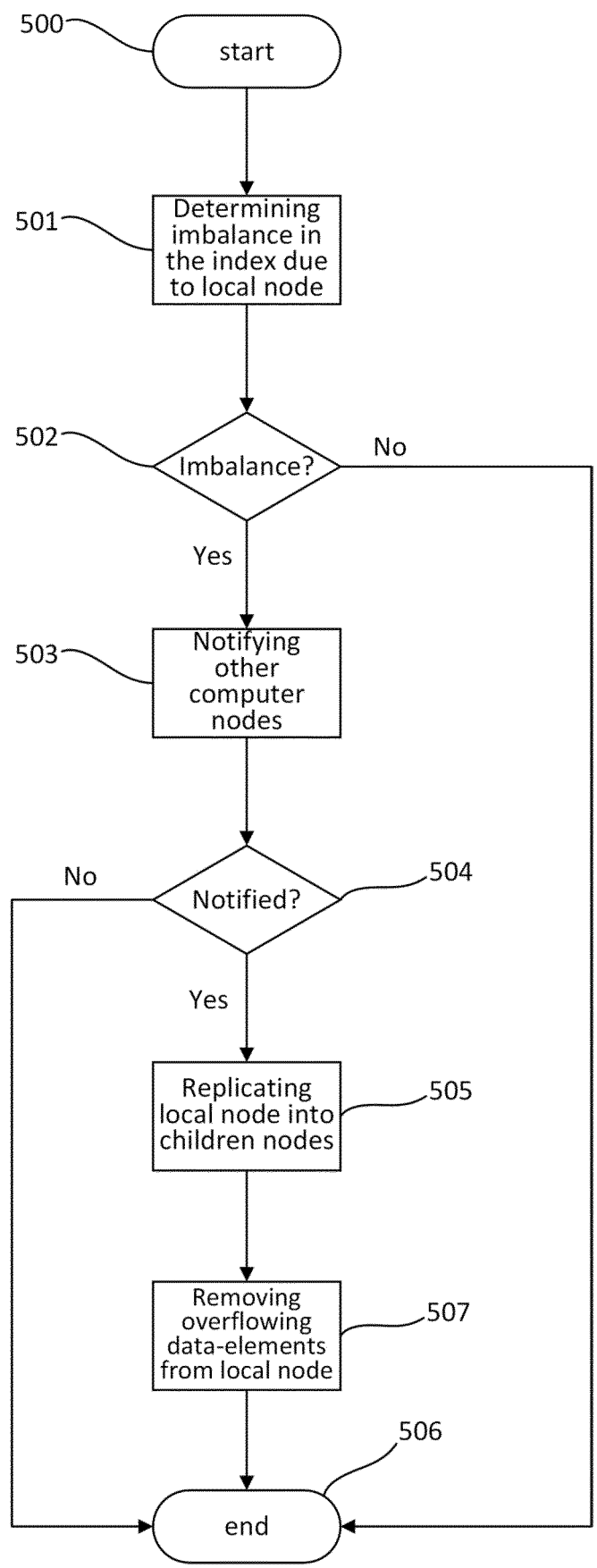
FIG. 5 is a flow chart schematically illustrating (optimizing) methods for optimizing a distributed index, according to further examples.

In case the optimizing (or inserting or querying) (computing) system (or computer-node) 300 is a combination of electronics and computing devices or systems, the computing devices or systems may be or include a set of instructions (e.g. a computer program) and the electronic devices or systems may be any electronic circuit capable of implementing the corresponding method operations of the proposed optimizing (or inserting or querying) methods, according to e.g. FIGS. 4 and 5 (or FIG. 6 or 7).

The computer program may be embodied on a storage medium (for example, a CD-ROM, a DVD, a USB drive, a computer memory or a read-only memory) or carried on a carrier signal (for example, on an electrical or optical carrier signal).

The computer program may be in the form of source code, object code, a code intermediate source and object code such as in partially compiled form, or in any other form suitable for use in implementing optimizing (or inserting or querying) methods according to e.g. FIGS. 4 and 5 (or FIG. 6 or 7). The carrier may be any entity or device capable of carrying the computer program.

For example, the carrier may include a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other devices or systems.

When the computer program is embodied in a signal that may be conveyed directly by a cable or other device or system, the carrier may be constituted by such cable or other device or system. Alternatively, the carrier may be an integrated circuit in which the computer program is embedded, the integrated circuit being adapted for performing, or for use in the performance of, the relevant methods.

FIG. 4 is a flow chart schematically illustrating methods of optimizing a distributed index, according to examples. The distributed index may have a tree structure according to e.g. FIG. 2. The (optimizing) methods may be performed by an optimizing system (or computer-node) according to e.g. FIG. 3, which may be included in a distributed system according to e.g. FIG. 1. Reference signs from FIGS. 1-3 may be re-used in the following description of FIG. 4 for the sake of better exposition.

At initial block 400, the optimizing method may be initiated, at an optimizing system (or computer-node) 300, as a result of (detecting) a starting condition such as e.g. activation of an optimizing functionality, reception of many requests of reading a tree-node (e.g. above a reading threshold) within a short period of time (e.g. below a time threshold), etc.

At block 401, an imbalance condition may be detected in the distributed index 200, caused (at least partially) by a tree-node stored in the computer-node 300, by consulting corresponding in-memory map 302 also stored in the computer-node 300. This tree-node may be denominated herein as "imbalance-inductor" tree-node.

At block 402, a decision operation may be performed depending on whether the imbalance has been detected at previous block 401. In case that the imbalance has been detected, the (optimizing) method may continue to block 403 and, otherwise, the method may proceed to final block 406 to finalize its execution.

The above functionalities implemented at blocks 401 and 402 may be performed by e.g. an imbalance detector module 304 such as the one previously described. Functional details and considerations about said module 304 may thus be similarly attributed to blocks 401 and 402.

At block 403, the other computer-nodes in the distributed system 100 may be notified about the detected imbalance condition, so as to cause/enforce that any insertion request into the imbalance-inductor tree-node, from any of the other computer-nodes, further includes inserting (or triggering insertion of) corresponding data-element(s) into children nodes of the imbalance-inductor tree-node. This functionality (or functionalities) may be performed by e.g. a notifier module 305 such as the one previously described. Functional details and considerations about said module 305 may thus be similarly attributed to block 403.

At block 404, a decision operation may be performed depending on whether the other computer-nodes have (correctly) received the notification generated at previous block 403. In case that the other computer-nodes have been (correctly) notified, the (optimizing) method may continue to block 405 and, otherwise, a transition to final block 406 may be performed so as to finalize the execution of the method.

At block 405, the data-elements stored in the "imbalance-inductor" tree-node may be replicated into corresponding children nodes of the imbalance-inductor tree-node. This functionality (or functionalities) may be performed by e.g. a replicator module 306 such as the one previously described. Functional details and considerations about said module 306 may hence be similarly attributed to block 405.

At block 406, the (optimizing) method may be terminated by e.g. providing optimization results, initializing a timer to count a new time interval till next execution of the method, releasing resources that have been dedicated to perform the method, etc.

FIG. 5 is a flow chart schematically illustrating methods of optimizing a distributed index, according to further examples. These methods may be similar to those described with reference to previous FIG. 4. In particular, methods according to FIG. 5 may include a start block 500, an imbalance-detector block 501, an imbalance-depending decision block 502, a notifier block 503, a notification-depending decision block 504, a replicator block 505 and an end block 506, which may be similar or coincident to blocks 400-406 of FIG. 4, respectively.

A difference may reside in a remover block 507 implementing a removal of overflowing data-elements from the imbalance-inductor tree-node, once the replication of the imbalance-inductor tree-node has been completed. This functionality (or functionalities) may be performed by e.g. a remover module 307 such as the one previously described. Functional details and considerations about said module 307 may therefore be similarly attributed to block 507.

FIG. 6 is a flow chart schematically illustrating methods of inserting a data-element in a distributed index equal or similar to the ones described herein. In some examples, said distributed index may be optimized by an optimizing method according to previous or similar examples. The distributed index may be similar to the ones described with reference to FIG. 2, and may be hosted in a distributed system similar to the ones described with reference to FIG. 1, which may include computer-nodes similar to the ones described with reference to FIG. 3. The optimizing method may be similar to the ones described with reference to FIGS. 4 and 5. Reference signs from FIGS. 1-5 may thus be re-used in following description of FIG. 6 for the sake of better exposition.

These insertion (or inserting) methods may be performed by either any of the computer-nodes 300 in the distributed system 100, or a client-node performing requests to (or interacting with) at least some of the computer-nodes 300 under e.g. a client-server approach, protocol or similar.

At initial block 600, the insertion method may be initiated as a result of (detecting) a starting condition such as e.g. reception of an insertion request including at least one data-element to be inserted into the index. A priority may be assigned to the data-element to be inserted. Said priority may be a random or pseudo-random priority, which may be calculated e.g. by applying a hash function to whole or part of the data-element to be inserted. Hash value returned by the hash function may be designated as the (random) priority of the data-element.

At block 601, an in-memory map 302 structurally defining the distributed index 200 may be inspected to detect which is the first tree-node in root-to-leaf direction (i.e. tree-node closest to root node) satisfying that space-coordinates (or z-order identifier) of the data-element (to be inserted) are within the domain (or z-order identifier) of said tree-node, and priority of the data-element is within the priority range of said tree-node. This detected tree-node may be selected as "from-node" or "initial tree-node". The concepts of space-coordinates, domain of a tree-node, and the fitting of space-coordinates within the domain of a tree-node have been described in detail with reference to e.g. FIG. 2. The concepts of priority of a data-element, priority range of a tree-node, and the fitting of a priority within a priority range have also been described in detail with reference to e.g. FIG. 2. The expression "root-to-leaf direction" may be defined e.g. as a top-bottom direction from the root tree-node towards leaf tree-nodes (i.e. tree-nodes without children nodes) or as a direction starting from the root tree-node and moving away therefrom.

At block 602, the in-memory map 302 may be inspected to determine, in the tree-structure 200, the first tree-node in root-to-leaf direction satisfying that space-coordinates of the data-element (to be inserted) are within the domain of said tree-node and, furthermore, said tree-node has not yet been replicated. This tree-node may be selected as "to-node" or "final tree-node". In some examples, determining whether a tree-node has not been replicated may be performed depending on whether the tree-node has Depth attribute equal to zero. The concept of Depth of a tree-node has been described in detail with reference to FIG. 2. In other implementations, not all the tree-nodes may have an (up-to-dated) Depth attribute represented in the in-memory map 302, in which case, determining whether a tree-node (without Depth attribute) has not been replicated may be performed also through or by a suitable approximate membership checker. The concept of approximate membership checker and its operation has been described in detail with reference to FIG. 3.

The initial tree-node and the final tree-node may define a series of updatable tree-nodes into which the data-element is includable. Said series of updatable tree-nodes may include both the initial tree-node and the final tree-node, along with tree-nodes in the tree-structure 200 that are descendant nodes of the initial tree-node and ancestor nodes of the final tree-node. In the case that the initial tree-node and final tree-node result to be the same tree-node, the series of updatable tree-nodes would only contain such coincident tree-node.

At block 603, an insertion procedure may be triggered including or causing insertion of the data-element into those tree-nodes in the series of updatable tree-nodes furthermore satisfying that the priority of the data-element is within the priority range of the updatable tree-node.

In some examples, the insertion method may be performed by a client-node (or client system) which may further include corresponding in-memory map. In this case, the insertion procedure may include sending, for each of the tree-nodes in the series of updatable tree-nodes, an insertion request to the computer-node storing the tree-node for causing said computer-node to perform the insertion of the data-element in the updatable tree-node.

If the insertion method is performed by a computer-node 300, local and/or remote insertion(s) may be undertaken. For any updatable tree-node locally stored in the computer-node 300, the insertion of the data-element may be performed locally by the computer-node 300. For any updatable tree-node remotely stored with respect the computer-node 300, an insertion request may be sent by the computer-node 300 to the other computer-node storing said updatable tree-node for causing said other computer-node to perform the insertion of the data-element.

At block 604, the insertion method may be terminated by e.g. providing insertion results, which may include including insertion results in activity log, releasing resources that have been dedicated to perform the insertion method, etc.

FIG. 7 is a flow chart schematically illustrating methods of reading or querying one or more data-elements in a distributed index equal or similar to the ones described herein. In some examples, said distributed index may be updated by optimizing and/or insertion methods according to previous or similar examples. The distributed index may be similar to the ones described with reference to FIG. 2, and may be hosted in a distributed system similar to the ones described with reference to FIG. 1, which may include computer-nodes similar to the ones described with reference to FIG. 3. Optimizing method(s) may be similar to the ones described with reference to FIGS. 4 and 5. Insertion method(s) may be similar to the ones described with reference to FIG. 6. Reference signs from FIGS. 1-6 may thus be re-used in following description of FIG. 7 for the sake of better exposition.

At initial block 700, the method may be initiated as a result of (detecting) a starting condition such as e.g. reception of a read request (or query) including query criterion or criteria to be fulfilled by data-elements to be read or consulted. The query criteria may include e.g. a domain scope defining one or more space-coordinates (or z-order identifiers) of data-elements or parts of the D-dimensional space to be consulted or retrieved. In some examples, the query criterion or criteria may further include a proportion scope defining a percentage or sample of the data-elements satisfying the domain scope. For example, a query may request accessing or consulting a 20% sample of data-elements satisfying determined space-coordinates criterion or criteria or domain scope.

At block 701, an in-memory map 302 structurally defining the distributed index 200 may be inspected to estimate which of the tree-nodes in the index 200 has smallest domain best matching the domain scope of the query. A verification of whether said best matching tree-node has been replicated may also be performed. In z-order implementations (see e.g. descriptions of FIG. 2), the best matching tree-node may be determined depending on a matching level between target z-order value(s) or range(s) defining the domain scope of the query and z-order based identifiers of the tree-nodes. The tree-node with z-order identifier mostly coinciding with highest weight digits (i.e. leftmost digits) in the target z-order value(s) defined by the domain scope of the query may be selected as the best matching tree-node. The verification of whether the best matching tree-node has been replicated may be performed depending on Depth attribute of the tree-node (see e.g. descriptions of FIG. 2). In particular, if Depth is greater than zero, it may mean that the tree-node has been replicated. In summary, block 702 may be configured to find that tree-node most distanced from the root of the tree structure 200 having a z-order identifier mostly coinciding with z-order value(s) defined by the domain scope of the query and, furthermore, to verify whether said best matching tree-node has been replicated, according to previously described principles.

At block 702, a decision operation may be performed depending on whether the best matching tree-node has been determined as having been replicated at previous block 701. In case that the best matching tree-node has been replicated, the method may continue to block 705 and, otherwise, the method may proceed to block 703.

At block 703, it is assumed that the best matching tree-node has not been replicated, in which case the in-memory map 302 (structurally defining the distributed index 200) may be inspected to identify first ancestor tree-node of the best matching tree-node that is known to have been replicated. The replicated first ancestor tree-node may be the closest ancestor tree-node of/to the (non-replicated) best matching tree-node. Then, once identified, said closest replicated ancestor tree-node may be designated, at block 704, as starting tree-node.

At block 705, it is assumed that the best matching tree-node has been replicated, in which case said best matching tree-node may be designated as starting tree-node.

At block 706, the in-memory map 302 (structurally defining the distributed index 200) may be inspected to identify, for the/each tree-node designated as starting node, one or more descendant tree-nodes of the starting node (or only the starting node itself) which are estimated to include together a sufficient number of different data-elements to fulfil the proportion scope of the query. In first iteration, starting node may have been designated at previous block 704 or 705. In non-first iteration(s), starting node(s) may have been designated at block 710 or 712 which are described below. If several starting nodes are to be considered (in e.g. a non-first iteration) a processing thread including specific instances of block 706 and subsequent blocks may be triggered for each of said starting nodes.

The estimation of how many or what proportion of data-elements are/is stored in a given tree-node may be performed, from the in-memory map 302, depending on the priority range of the tree-node and the widest range of priorities that are assignable to data-elements (see e.g. descriptions of FIG. 2). The number or proportion of data-elements within the tree-node's domain that are stored in the tree-node may be estimated according to following formula:

$$\% \text{ node} = \frac{\text{assignable\_priority\_range}}{\text{node\_priority\_range}} \quad \text{Formula 1}$$

wherein % node is the proportion of data-elements within the tree-node's domain that are stored in the tree-node, assignable_priority_range corresponds to the widest range of priorities that are assignable to data-elements, and node_priority_range is the part of the widest range of assignable priorities covered by the priority range of the tree-node.

In an example, if the widest range of assignable priorities is between 0 and 1 (both included) and the priority range of the tree-node is 0.1, the proportion of data-elements within the tree-node's domain that are stored in the tree-node is estimated to be 10%, according to Formula 1:

$$\% \text{ node} = \frac{1-0}{0.1} = \frac{1}{0.1} = 10\%$$

Identifying tree-node(s) among the/each starting node and descendant nodes thereof including sufficient data-elements to fulfil the proportion scope of the query may include estimating, from the in-memory map 302, a number of levels to be jumped from the/each starting node to access tree-nodes at the level that has been jumped to, so as to satisfy the proportion scope of the query. In this sense, a minimum number of tree-nodes including sufficient data-elements may be first estimated depending on the proportion scope of the query and a proportion of data-elements within the starting node's domain that are stored in the starting node. This proportion of data-elements within the starting node may be calculated in same or similar manner as described with reference to Formula 1.

The aforementioned minimum number of nodes to be accessed may be estimated through the following formula:

$$\text{min\_number} = \frac{\% \text{ query}}{\% \text{ node}} \qquad \text{Formula 2}$$

wherein min_number is the minimum number of nodes to be accessed, % query is the proportion scope (or percentage or sample scope) of the query, and % node is the proportion of data-elements within the starting node's domain that are stored in the starting node.

In a situation of example, if the proportion scope defined in the query is 20% and the proportion of data-elements in the starting node is 20%, the minimum number of nodes to be accessed would be equal to 1 (according to Formula 2) which corresponds to only the starting node. In other words, it is estimated that accessing only the starting node is enough to fulfil the query because the sample required by the query is 20% and the starting node is estimated to include such a 20% of data-elements within its domain.

In another situation of example, if the proportion scope defined in the query is 60% and the proportion of data-elements in the starting node is 20%, the minimum number of nodes to be accessed would be equal to 3 (according to Formula 2) which may mean that accessing three descendant nodes of the starting node is estimated to be required for fulfilling the query.

Once the minimum number of nodes (min_number in Formula 2) is known, a number of tree-levels to be jumped from the starting node may be estimated so as to fulfil the query. This estimation may be performed depending on the calculated minimum number of nodes (min_number) and the number of children nodes of any parent node in the tree structure 200. As described with respect to FIG. 2, any tree-node in the tree structure 200 may have either zero or $2^D$ children nodes (D=dimensions of the D-dimensional space). Hence, the number of children nodes of any parent node is equal to $2^D$ children nodes. For example, if the D-dimensional space is a 3D space, the number of children nodes of any parent node would be equal to $2^3=8$.

The number of tree-levels to be jumped from the/each starting node may be calculated according to e.g. the following formula:

$$\text{jump} = \text{round\_up}(\log_{2^D}(\text{min\_number})) \qquad \text{Formula 3}$$

wherein jump is the tree-levels to be jumped from the starting node, min_number is the minimum number of nodes to be accessed of Formula 2, $\log_{2^D}$ is a function that returns the base-$2^D$ logarithm of a number, and round_up is a function that rounds a number up, away from 0 (zero).

In a situation of example, if D is equal to three (3D space) and the calculated minimum number of nodes is 1 (one), the tree-levels to be jumped from the starting node is equal to 0 (zero) according to Formula 3:

$$\text{jump} = \text{round\_up}(\log_8(1)) = \text{round\_up}(0) = 0$$

which means that access to only the starting node may suffice to fulfil the proportion scope of the query.

In another situation of example, if D is equal to three (3D space) and the calculated minimum number of nodes is 3 (three), the tree-levels to be jumped from the starting node is equal to 1 (one) according to Formula 3:

$$\text{jump} = \text{round\_up}(\log_8(3)) = \text{round\_up}(0.52832083357) = 1$$

which means that access to children nodes of the starting node may suffice to fulfil the proportion scope of the query.

In a further situation of example, if D is equal to three (3D space) and the calculated minimum number of nodes is 15 (fifteen), the tree-levels to be jumped from the starting node is equal to 2 (two) according to Formula 3:

$$\text{jump} = \text{round\_up}(\log_8(15)) = \text{round\_up}(1.3022968652) = 2$$

which means that access to children nodes of the children nodes of the starting node may suffice to fulfil the proportion scope of the query.

At block 707, the in-memory map 302 may be inspected to obtain the Depth attribute of the starting node and to compare it with the number of levels to be jumped calculated at block 706, so as to determine a minimum value between the Depth and the estimated levels to be jumped. Such a minimum value may be also denominated as minimum jump. In some examples, a predefined longest permissible jump may be taken into account, which may have been predefined to prevent that excessive simultaneous accesses to different tree-nodes are performed, thereby avoiding overload of the system. In these last examples, the lowest or minimum jump may be selected from among the Depth of the starting node, the calculated number of levels to be jumped (from block 706), and the predefined longest permissible jump (to avoid system overload).

At block 708, a decision operation may be performed depending on whether the lowest or minimum jump (determined at block 707) is greater than the Depth of the starting node. In case that the lowest or minimum jump is above Depth, the method may continue to block 710 and, otherwise, the method may proceed to block 709. Note that if Depth is zero, then the lowest or minimum jump is also zero and, therefore, the lowest or minimum jump is NOT above Depth, so in said case, the method may proceed to block 709 (and not to block 710).

At block 710, it is assumed that at least some of the descendant nodes to be accessed are outside the perfect $2^D$-ary sub-tree whose root is the starting node, in which case a new iteration from block 706 may be required to ensure that descendant nodes to be accessed are within a perfect $2^D$-ary sub-tree. Accordingly, tree-nodes at a distance from corresponding (current) starting node(s) equal to the Depth of the starting node may be designated as (new) starting nodes, so as to initiate a (new) iteration from block 706 taking into account said designated (new) starting nodes. Accordingly, once said designation has been completed, the method may loop back to previous block 706 to initiate a new iteration for each of the designated (new) starting nodes.

At block 709, a target tree-level may be determined according to the lowest or minimum jump from starting node (calculated at block 707), for accessing the tree-nodes at said target level which may be either descendant nodes of the starting node or only the starting node itself. Once such an access has been performed, it may be verified whether either sufficient data-elements have been accessed to fulfil the query or the minimum jump is zero (i.e. Depth=0). The accessed data-elements may be collected for their inclusion in corresponding reply to the query. Note that if the lowest or minimum jump is zero, this means that the target level corresponds to the tree-level of the starting node and, therefore, only the starting node may be accessed (at current iteration) for gathering data-elements to reply the query. If the lowest or minimum jump is zero, this may also mean that the Depth of the starting node is zero and, therefore, the starting node has not been replicated and, therefore, further jumps may not be possible and, therefore, no more data-elements may be obtained by the processing thread of said starting node.

At block 711, a decision operation may be performed depending on whether the (proportion) scope of the query is fulfilled with the performed access or accesses (collected data-elements). In the case that the query is fulfilled, a transition to end block 713 may be performed to terminate the method and, otherwise, a transition to block 712 may be undertaken. The query may be fulfilled when all processing threads (triggered at block 706) have retrieved together sufficient data-elements to satisfy the (proportion) scope of the query. A processing thread that cannot obtain more data-elements because non-replicated tree-nodes (Depth=0) have been reached, may stay on hold as completed until remaining threads are also completed. The query may be assumed as fulfilled when all the processing threads have retrieved a number or proportion of data-elements satisfying the (proportion) scope of the query, or all the processing threads have reached non-replicated tree-nodes and, therefore, no more data-elements may be obtained by the threads, or both conditions.

At block 712, the tree-nodes accessed at previous block 709 may be designated as (new) starting nodes, so as to initiate a (new) iteration from block 706 taking into account said designated (new) starting nodes. Accordingly, once such a designation has been completed, the method may loop back to previous block 706 to initiate new iteration for each of the previously accessed tree-nodes that have been designated as (new) starting nodes.

At end block 713, the method may be terminated by e.g. providing query results, which may include providing retrieved data-elements to requester, including reading results/parameters in activity log, releasing resources that have been dedicated to perform the insertion method, etc. In the case that all the processing threads have been completed but not enough data-elements have been retrieved to fulfil the scope of the query, a warning or similar may be produced to e.g. indicate that requested proportion has not been reached.

In the different examples described herein, different pre-defined thresholds (or reference values) may be used to identify special situations depending on e.g. a variable magnitude (number of readings, elapsed time, storage capacity, computational capacity, etc.) which is compared with corresponding threshold (or range). Examples of such pre-defined thresholds are the (predefined) reading threshold, time threshold, permissible storage capacity, longest permissible jump, etc. Any of said predefined thresholds may have been pre-determined by performing suitable experiments to determine e.g. from which value the variable magnitude may indicate the targeted special situation. These experiments may have been based on e.g. calculations of test (or sample) data and corresponding validation by competent user to (continuously and/or regularly) refine or adjust the threshold. This refinement may be performed as many times as required along the life of corresponding method (and software/system) and possibly depending on results provided by the method itself. Some of these thresholds may correspond to the same or similar concept but they may have been differently denominated to differentiate them depending on functionality or context of application.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method of optimizing a distributed index having a tree structure comprising a plurality of tree-nodes including a root node, a plurality of non-root nodes and parent-child relations between the tree-nodes;

the root node covering a D-dimensional space, and each of the non-root nodes covering a part of the D-dimensional space such that each of the non-root nodes with same parent node covers a partition of the whole or part of the D-dimensional space or domain covered by said parent node;

at least some of the tree-nodes storing one or more data-elements each having space-coordinates within the whole or part of the D-dimensional space or domain covered by the tree-node in which the data-element is stored;

the distributed index being disposed in a distributed system including a plurality of computer-nodes, and each of at least some of the tree-nodes is stored at one of the computer-nodes along with an in-memory map structurally describing the distributed index; the method comprising:

inspecting, by a first computer-node in the plurality of computer-nodes, the in-memory map stored at the first computer-node and determining that the distributed index satisfies a storage imbalance condition caused by at least a first tree-node stored in the first computer-node and, in response, triggering a reorganization method including:

notifying, by the first computer-node, to the other computer-nodes in the plurality of computer-nodes that the first tree-node is to be replicated, to enforce or provoke that any request from any of the other computer-nodes of inserting a data-element in the first-tree-node further includes inserting the data-element in a child node of the first-tree-node, depending on the space-coordinates of said data-element and the part of the D-dimensional space or domain covered by said child node; and verifying, by the first computer-node, that the other computer-nodes have been notified and, in response, replicating the data-elements stored in the first tree-node into children nodes of the first tree-node depending on the space-coordinates of each of said data-elements and the part of the D-dimensional space or domain covered by each of said children nodes.

2. A method according to claim 1 the space-coordinates of a stored data-element corresponding to spatial coordinates of a key value, unique identifier, or any combination of attributes of the data-element designating or pointing to a particular location in the D-dimensional space.

3. A method according to claim 1 the notifying to the other computer-nodes that the first tree-node is to be replicated comprises sending, by the first computer-node, a notification to the other computer-nodes indicating that the first tree-node is to be replicated.

4. A method according to claim 3 the verifying whether the other computer-nodes have been notified includes receiving from the other computer-nodes, by the first computer-node, a reply to the notification indicating that the notification has been received by the other computer-nodes.

5. A method according to claim 1, each of the tree-nodes having a real storage capacity and a permissible storage capacity smaller than the real storage capacity; and the determining whether the distributed index satisfies the storage imbalance condition comprises determining, by the first computer-node, whether at least the first tree-node is storing a number of data-elements which is at or exceeds the permissible storage capacity of the first tree-node.

6. A method according to claim 5 the determining whether at least the first tree-node is storing a number of data-elements which is at or exceeds the permissible storage capacity further comprises determining, by the first computer-node, whether the first tree-node is to be read for replying a read request or query.

7. A method according to claim 6 the verifying whether the other computer-nodes have been notified further includes determining, by the first computer-node, whether the reading of the first tree-node for replying the read request or query has been completed before the computer-nodes have been notified.

8. A method according to claim 1 the determining whether the distributed index satisfies the storage imbalance condition comprises:

determining, by the first computer-node, a difference between replicated and non-replicated tree-nodes at same tree-level within a sub-tree of the tree-structure, and verifying whether said difference exceeds a predefined replication difference threshold.

9. A method according to claim 1, each of the tree-nodes having a priority range and each of the data-elements having a priority;

each non-replicated tree-node having its priority range equal to widest range of priorities that are assignable to data-elements to provoke that the priority of any data-element includable in the non-replicated tree-node depending on its space-coordinates, is also within the priority range of the non-replicated tree-node; and the reorganization method further comprising adjusting the priority range of the first tree-node to define which of the data-elements in the tree-node is/are within or outside the permissible storage capacity depending on whether the priority of the data-element is within or outside the priority range of the tree-node.

10. A method according to claim 9, the priority range including a top-priority defining that the data-elements in the first tree-node with priority below the top-priority is within the permissible storage capacity and, otherwise, is outside the permissible storage capacity.

11. A method according to claim 10 the adjusting the top-priority comprising:

sorting the priorities of the data-elements stored in the first tree-node, and selecting a priority from the sorted priorities as the top-priority such that the permissible storage capacity is completed by the data-elements with priority below the top-priority, and the data-elements with priority above the top-priority are outside the permissible storage capacity.

12. A method according to claim 9 the priority range including a bottom-priority defining that the data-elements in the first tree-node with priority above the bottom-priority is within the permissible storage capacity and, otherwise, is outside the permissible storage capacity.

13. A method according to claim 12 the adjusting the bottom-priority comprising:

sorting the priorities of the data-elements stored in the first tree-node, and selecting a priority from the sorted priorities as the bottom-priority such that the permissible storage capacity is completed by the data-elements with priority above the bottom-priority, and the data-elements with priority below the bottom-priority are outside the permissible storage capacity.

14. A method according to claim 9 the reorganization method further comprising verifying whether the replication of the first tree-node has been completed and, if so, removing from the first tree-node the data-elements with priority outside the priority range of the first tree-node.

15. A method according to claim 9 the priority of a data-element being a random or pseudo-random priority; or being calculated by applying a hash-function to at least part of the data-element, or being calculated by applying the hash-function to a unique identifier or a key value of the data-element.

16. A non-transitory medium comprising a computer program having program instructions for causing a computing system to perform a method according to claim 1 of optimizing a distributed index.

17. A computing system for optimizing a distributed index, the computing system comprising a memory and a processor, embodying instructions stored in the memory and executable by the processor, the instructions comprising functionality to execute a method according to claim 1 of optimizing a distributed index.

18. A method of inserting a data-element into a distributed index having a tree structure comprising a plurality of tree-nodes including a root node, a plurality of non-root nodes and parent-child relations between the tree-nodes;

the root node covering a D-dimensional space, and each of the non-root nodes covering a part of the D-dimensional space such that each of the non-root nodes with same parent node covers a partition of the whole or part of the D-dimensional space or domain covered by said parent node;

at least some of the tree-nodes storing one or more data-elements each having space-coordinates within the whole or part of the D-dimensional space or domain covered by the tree-node in which the data-element is stored;

the distributed index being disposed in a distributed system including a plurality of computer-nodes, and each of at least some of the tree-nodes is stored at one of the computer-nodes along with an in-memory map structurally describing the distributed index;

at least some of the tree-nodes having been replicated into children nodes to compensate or resolve a storage imbalance condition induced at least by said tree-node and to optimize the distributed index;

each of at least some of the tree-nodes having a real storage capacity and a permissible storage capacity smaller than the real storage capacity;

each of at least some of the tree-nodes having a priority range, and each of at least some of the data-elements having a priority, the priority range defining which of the data-elements stored in the tree-node is/are within or outside the permissible storage capacity depending on whether the priority of the data-element is within or outside the priority range of the tree-node; and said method of inserting a data-element comprising:

determining a series of updatable tree-nodes of the tree-nodes having a priority including an initial tree-node, one or more intermediate tree-nodes and a final tree-node; and inserting the data-element into each updatable tree-node that is within the series of updatable tree-nodes and satisfies that priority of the data-element to be inserted is within the priority range of said updatable tree-node;

the initial tree-node being a tree-node closest to the root tree-node, satisfying that space-coordinates and priority of the data-element to be inserted are/is within the domain and priority range of said initial tree-node, respectively;

the final tree-node being a descendant node of the initial tree-node, satisfying that said final tree-node has not been replicated and space-coordinates of the data-element to be inserted are within the domain of said final tree-node and;

each of the one or more intermediate updatable tree-nodes being a descendant node of the initial tree-node and an ancestor node of the final tree-node.

19. A method of replying a query by accessing a distributed index having a tree structure comprising a plurality of tree-nodes including a root node, a plurality of non-root nodes and parent-child relations between the tree-nodes;

the root node covering a D-dimensional space, and each of the non-root nodes covering a part of the D-dimensional space such that each of the non-root nodes with same parent node covers a partition of the whole or part of the D-dimensional space or domain covered by said parent node;

at least some of the tree-nodes storing one or more data-elements each having space-coordinates within the whole or part of the D-dimensional space or domain covered by the tree-node in which the data-element is stored;

the distributed index being disposed in a distributed system including a plurality of computer-nodes, and each of at least some of the tree-nodes is stored at one of the computer-nodes along with an in-memory map structurally describing the distributed index;

at least some of the tree-nodes having been replicated into children nodes to compensate or resolve a storage imbalance condition induced at least by said tree-node and to therefore optimize the distributed index;

each of at least some of the tree-nodes having a real storage capacity and a permissible storage capacity smaller than the real storage capacity;

each of at least some of the tree-nodes having a priority range, and each of at least some of the data-elements having a priority, the priority range defining which of the data-elements stored in the tree-node is/are within or outside the permissible storage capacity depending on whether the priority of the data-element is within or outside the priority range of the tree-node;

the query including a domain scope defining one or more parts of the D-dimensional space to be consulted, and a proportion scope defining a proportional sample of the domain scope;

at least some of the tree-nodes having a depth attribute indicating a number of levels of descendant nodes of said tree-node forming together a perfect $2^D$-ary tree with said tree-node as root of said perfect $2^D$-ary tree; the method of replying a query, or querying method, comprising:

determining a tree-node in the tree-structure with smallest domain and best matching the domain scope of the query;

verifying whether the best matching tree-node has been replicated and, if so, designating the best matching tree-node as starting node and, otherwise, determining an ancestor node of the best matching tree-node, which is closest to the best matching tree-node and has been replicated, and designating said replicated ancestor node as a starting node;

iteratively performing a loop until the proportion scope of the query is fulfilled, the loop comprising:

determining a number of tree-levels to be jumped from the/each designated starting node, such that tree-nodes at the tree-level to be jumped to are estimated to include sufficient data-elements to fulfil the proportion scope of the query;

determining a minimum value between the number of tree-levels to be jumped and the depth of the starting node;

verifying whether said minimum value or minimum jump is greater than the depth of the starting node and, if so, determining descendant nodes of the starting node that are at a distance from the starting node equal to the depth of the starting node and designating said descendant nodes as new starting nodes to initiate a new iteration of the loop for each of said new starting nodes and, otherwise, performing the minimum jump from the starting node to a target tree-level and accessing tree-nodes at said target tree-level;

verifying whether the performed accesses have caused fulfilling of the proportion scope of the query and, if so, quitting the loop and, otherwise, designating the accessed tree-nodes as new starting nodes to initiate a new iteration of the loop for each of said new starting nodes.

* * * * *